US012669344B2

(12) United States Patent
Malta et al.

(10) Patent No.: US 12,669,344 B2
(45) Date of Patent: Jun. 30, 2026

(54) SPATIAL AUDIO FOR WAYFINDING

(71) Applicant: Waymo LLC, Mountain View, CA (US)

(72) Inventors: Kevin Malta, San Francisco, CA (US); Jonathan Willing, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 269 days.

(21) Appl. No.: 17/862,587

(22) Filed: Jul. 12, 2022

(65) Prior Publication Data

US 2023/0228585 A1 Jul. 20, 2023

Related U.S. Application Data

(63) Continuation-in-part of application No. 17/578,896, filed on Jan. 19, 2022, now Pat. No. 12,422,266.

(Continued)

(51) Int. Cl.
*G01C 21/36* (2006.01)
*G01C 21/28* (2006.01)
(Continued)

(52) U.S. Cl.
CPC ......... *G01C 21/3629* (2013.01); *G01C 21/28* (2013.01); *G01C 21/3438* (2013.01);
(Continued)

(58) Field of Classification Search
CPC .......................... G01C 21/3629; G01C 21/28; G01C 21/3438; G01C 21/3661; G08B 3/10; H04S 7/304
See application file for complete search history.

(56) References Cited

U.S. PATENT DOCUMENTS 8,422,693 B1 * 4/2013 Daily ................ G01C 21/3629
381/86
8,676,427 B1 3/2014 Ferguson et al.
(Continued)

FOREIGN PATENT DOCUMENTS

CN 103959015 A 7/2014
CN 107111332 A 8/2017
(Continued)

OTHER PUBLICATIONS

The Extended European Search Report for European Patent Application No. 23165209.0, Oct. 17, 2023, 13 Pages.
(Continued)

*Primary Examiner* — Navid Z. Mehdizadeh
*Assistant Examiner* — Oliver Tan
(74) *Attorney, Agent, or Firm* — Botos Churchill IP Law LLP

(57) ABSTRACT

The technology employs spatial audio information to enhance wayfinding for pickup, drop-off and in-vehicle situations. The spatial information has a directional component, and a sense of distance can also be incorporated into the audio information. Audio cues or other spatial information is provided via headphones worn by a user. The spatial audio gives the user direction information, which can help locate the vehicle. In addition, this approach can be used when the rider is in the vehicle prior to exiting. For instance, spatial audio can be provided to the rider to give them contextual information about the environment outside the vehicle prior to exiting, such as whether a bicyclist is approaching on the side they will be exiting. This contextual information can alert the rider to wait or otherwise be more situationally aware when departing the vehicle.

24 Claims, 26 Drawing Sheets

Related U.S. Application Data

(60) Provisional application No. 63/336,411, filed on Apr. 29, 2022.

(51) Int. Cl.
*G01C 21/34* (2006.01)
*G08B 3/10* (2006.01)
*H04S 7/00* (2006.01)

(52) U.S. Cl.
CPC ........... *G01C 21/3661* (2013.01); *G08B 3/10* (2013.01); *H04S 7/304* (2013.01)

(56) References Cited

U.S. PATENT DOCUMENTS

| | | | |
|---|---|---|---|
| 8,996,296 | B2 | 3/2015 | Xiang |
| 9,612,722 | B2 | 4/2017 | Miller et al. |
| 9,613,386 | B1 | 4/2017 | Arden et al. |
| 9,928,734 | B2 | 3/2018 | Newman |
| 10,126,136 | B2 | 11/2018 | Iagnemma |
| 10,319,128 | B2 | 6/2019 | Billi-Duran et al. |
| 10,388,075 | B2 | 8/2019 | Schmirler et al. |
| 10,423,834 | B2 | 9/2019 | Badalamenti et al. |
| 10,508,925 | B2 | 12/2019 | Badalamenti et al. |
| 10,580,291 | B1 | 3/2020 | Rothenberg et al. |
| 10,696,222 | B1 | 6/2020 | Pandit et al. |
| 10,714,116 | B2 | 7/2020 | Tintor et al. |
| 10,977,272 | B2 | 4/2021 | Nadler |
| 11,030,818 | B1 | 6/2021 | Wang et al. |
| 11,041,733 | B2 | 6/2021 | Kline et al. |
| 11,118,930 | B2 | 9/2021 | Eyler et al. |
| 11,120,264 | B2 | 9/2021 | O'Connell et al. |
| 11,195,409 | B1 | 12/2021 | Rothenberg et al. |
| 11,709,068 | B2 | 7/2023 | Sommer et al. |
| 2014/0028477 | A1 | 1/2014 | Michalske |
| 2014/0171039 | A1 | 6/2014 | Bjontegard |
| 2015/0134240 | A1 | 5/2015 | Yamada et al. |
| 2015/0199020 | A1 | 7/2015 | Hatada et al. |
| 2016/0124707 | A1* | 5/2016 | Ermilov ............... G08G 1/0962 |
| | | | 345/156 |
| 2017/0109916 | A1* | 4/2017 | Kurz ..................... H04N 7/183 |
| 2017/0153714 | A1 | 6/2017 | Gao et al. |
| 2017/0277191 | A1 | 9/2017 | Fairfield et al. |
| 2017/0316696 | A1 | 11/2017 | Bartel |
| 2017/0343375 | A1 | 11/2017 | Kamhi et al. |
| 2017/0344010 | A1 | 11/2017 | Rander et al. |
| 2018/0196415 | A1 | 7/2018 | Iagnemma et al. |
| 2018/0299895 | A1 | 10/2018 | Knotts et al. |
| 2018/0302736 | A1 | 10/2018 | Trestain |
| 2019/0017839 | A1 | 1/2019 | Eyler et al. |
| 2020/0191593 | A1 | 6/2020 | Herman et al. |
| 2020/0382896 | A1* | 12/2020 | Eronen ................... H04S 7/304 |
| 2021/0097866 | A1* | 4/2021 | Leary ..................... G08G 1/205 |
| 2021/0337298 | A1* | 10/2021 | Maguire ................. H04R 1/32 |
| 2021/0374407 | A1 | 12/2021 | O'Connell et al. |
| 2023/0020119 | A1* | 1/2023 | Leary ..................... G06Q 10/02 |

FOREIGN PATENT DOCUMENTS

| | | | |
|---|---|---|---|
| CN | 108737930 | A | 11/2018 |
| CN | 111148969 | A | 5/2020 |
| EP | 3213177 | B1 | 2/2021 |
| WO | 2013190637 | A1 | 12/2013 |
| WO | 2020190254 | A1 | 9/2020 |
| WO | 2020222325 | A1 | 11/2020 |

OTHER PUBLICATIONS

Bradley, Nicholas A., et al., "An Experimental Investigation into Wayfinding Directions for Visually Impaired People", Personal and Ubiquitous Computing ISSN 1617-4909, University of Strathclyde, 2005, pp. 395-403.

Dunai, Larisa , et al., "Real-Time Assistance Prototype—a new Navigation Aid for blind people", ResearchGate, 2010 IEEE, pp. 1173-1178.

Flores, G., et al., "Vibrotactile Guidance for Wayfinding of Blind Walkers", Published by the IEEE Computer Society, 2015, pp. 1-13.

Jacobs, J. , et al., "Potential Augmented Reality Applications in the Mining Industry", ResearchGate, 2016, pp. 1-15.

Lee, Sooyeon , et al., "Conversations for Vision: Remote Sighted Assistants Helping People with Visual Impairments", arXiv:1812.00148v1 [cs.HC] Dec. 1, 2018, pp. 1-19.

Marston, James R., et al., "Nonvisual Route Following with Guidance from a Simple Haptic or Auditory Display", Journal of Visual Impairment & Blindness, AFB, 2007, pp. 203-211.

Myers, Misha , "Walk with me, talk with me: the art of conversive wayfinding", Visual Studies, vol. 25, No. 1, 2010, pp. 1-12.

Noceti, Nicoletta , et al., "Designing audio-visual tools to support multisensory disabilities", Chapter 4, 2019, pp. 79-102.

Ochsner, Beate , et al., "Rethinking Assistive Technologies: Users, Environments, Digital Media, and App-Practices of Hearing", Nanoethics, https://doi.org/10.1007/s11569-020-00381-5, 2020, pp. 1-15.

Paneels, Sabrina A., et al., "The Walking Straight Mobile Application: Helping the Visually Impaired Avoid Veering", ICAD 2013, pp. 1-32.

Prasad, Manoj , et al., "HaptiMoto: Turn-by-Turn Haptic Route Guidance Interface for Motorcyclists", ResearchGate, Session: Location-Based Services and Navigation, CHI 2014, One of a CHInd, Toronto, ON, Canada, pp. 3597-3606.

Singh, Mona , et al., "Augmented Reality Interfaces", Computer Science, IEEE Internet Computing, https://www.semanticscholar.org/paper/Augmented-Reality-Interfaces-Singh-Singh/c2bc18f1a8b18819daedb780975f708b36718557, 2013, pp. 1-8.

Wen, Ming-Chang , et al., "Augmented Reality and Unmanned Aerial Vehicle Assist in Construction Management", Computing in Civil and Building Engineering, ASCE, 2014, pp. 1570-1577.

Wenqiang, Jin , et al., "Acoussist: An Acoustic Assisting Tool for People with Visual Impairments to Cross Uncontrolled Streets", Proc. ACM Interact. Mob. Wearable Ubiquitous Technol., vol. 4, No. 4, Article 133. Publication date: Dec. 2020, pp. 1-30.

European Search Report for Application No. EP23151299 dated Jun. 22, 2023.

The First Office Action for Chinese Patent Application No. 202310484439.5, Jan. 21, 2026, 24 Pages.

\* cited by examiner

100

120

102

106a

106b

104

160

400

500

520

600

640

642 Processing Module

644 Memory Module
Instructions
Data

646 Communication Module:
- WiFi, NFC, Bluetooth™

648 Orientation Sensor(s)
- Accelerometer
- Inertial measurement unit
- Gyroscope
- Magnetometer 650 Speaker(s)

652 Microphone(s)

654 Power Module

656 Power/Data Port

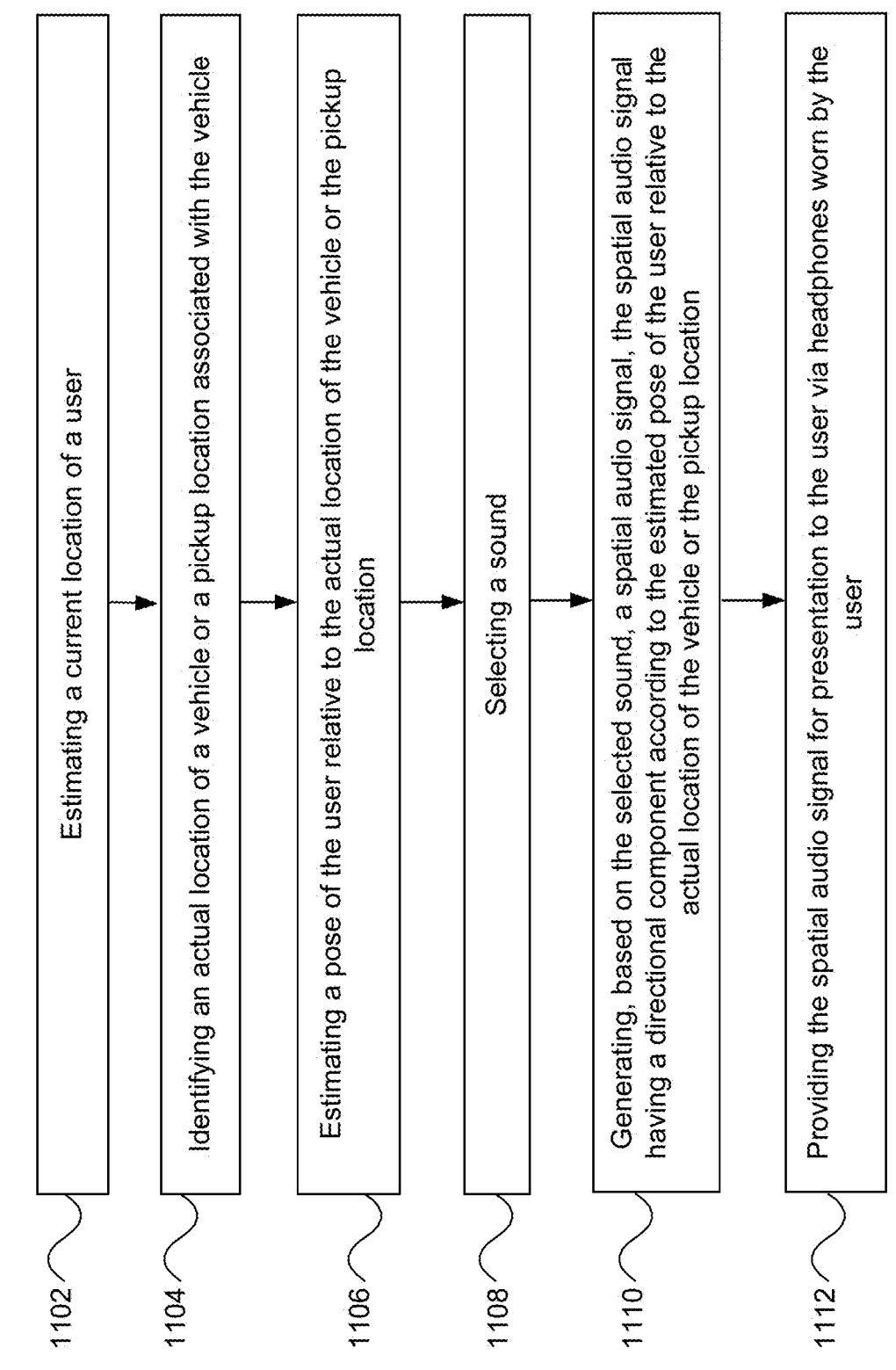

1102 — Estimating a current location of a user

1104 — Identifying an actual location of a vehicle or a pickup location associated with the vehicle 1106 — Estimating a pose of the user relative to the actual location of the vehicle or the pickup location 1108 — Selecting a sound 1110 — Generating, based on the selected sound, a spatial audio signal, the spatial audio signal having a directional component according to the estimated pose of the user relative to the actual location of the vehicle or the pickup location 1112 — Providing the spatial audio signal for presentation to the user via headphones worn by the user

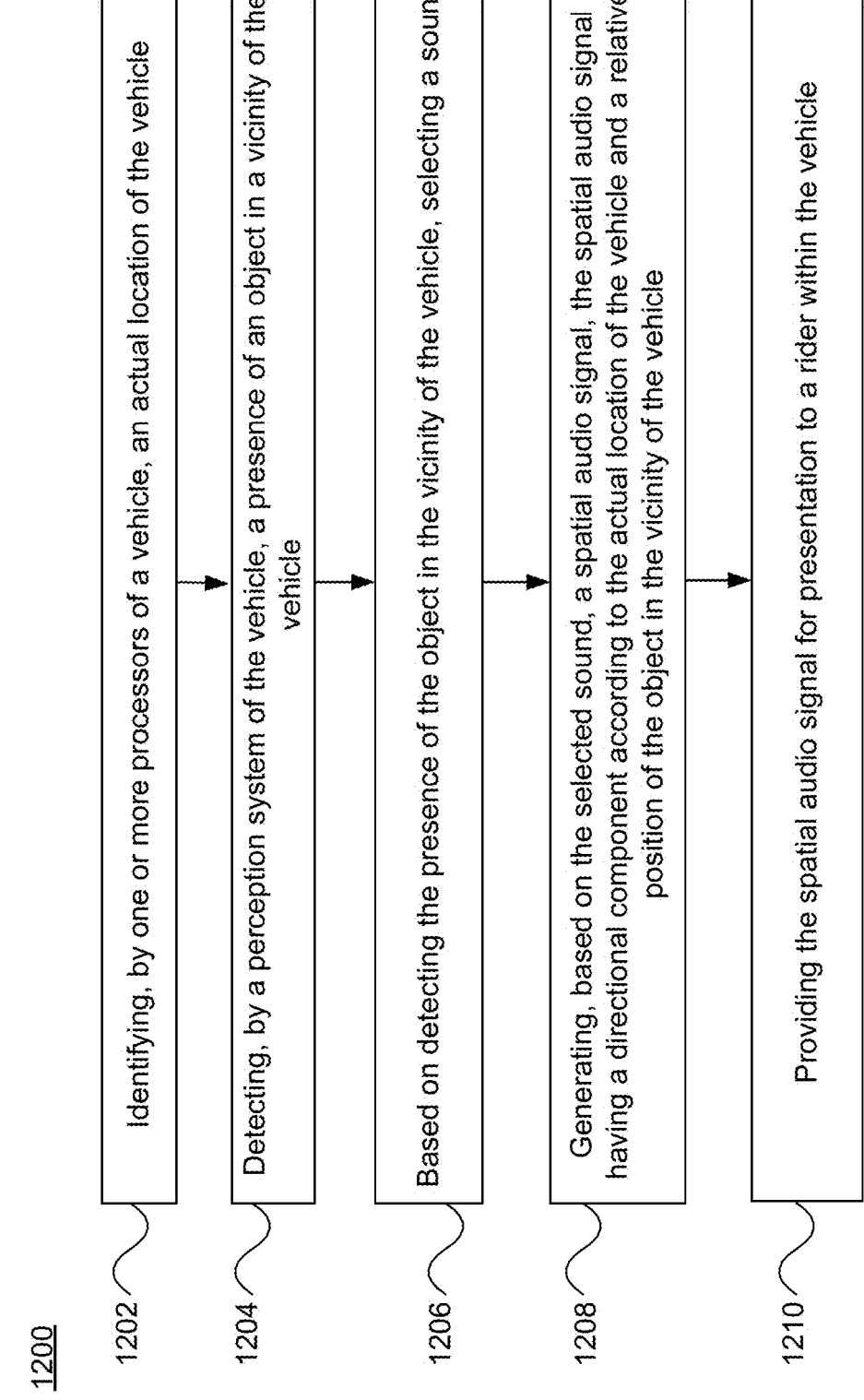

1202 — Identifying, by one or more processors of a vehicle, an actual location of the vehicle 1204 — Detecting, by a perception system of the vehicle, a presence of an object in a vicinity of the vehicle 1206 — Based on detecting the presence of the object in the vicinity of the vehicle, selecting a sound 1208 — Generating, based on the selected sound, a spatial audio signal, the spatial audio signal having a directional component according to the actual location of the vehicle and a relative position of the object in the vicinity of the vehicle 1210 — Providing the spatial audio signal for presentation to a rider within the vehicle

SPATIAL AUDIO FOR WAYFINDING

CROSS-REFERENCE TO RELATED APPLICATIONS

This application is a continuation-in-part of U.S. application Ser. No. 17/578,896, filed Jan. 19, 2022 the entire disclosure of which is incorporated by reference herein. This application claims the benefit of the filing date of U.S. Provisional Application No. 63/336,411, filed Apr. 29, 2022, the entire disclosure of which is incorporated by reference herein.

BACKGROUND

Autonomous vehicles, for instance, vehicles that may not require a human driver in certain driving situations, can be used to aid in the transport of passengers or items from one location to another. Such vehicles may operate in a fully autonomous mode where passengers may provide some initial input, such as a pickup or destination location, and the vehicle maneuvers itself to that location. However, for a variety of reasons it may be challenging to guide a rider or other user to a specific location to meet a vehicle, or to identify which vehicle to go to. These different types of situations could adversely impact the rider or other user's experience, delay pickup or drop-off, cause missed or delayed deliveries, or create other issues. For instance, having a vehicle honk its horn to identify its location may create unnecessary noise pollution and be distracting to people nearby. In addition, in high noise environments such as a city street dining rush hour, it may be very difficult to determine which vehicle honked or which direction the honk came from.

BRIEF SUMMARY

The technology relates to using spatial audio information to enhance wayfinding for pickups and drop-offs, deliveries, as well as to improve the in-vehicle experience for riders. The audio information has a directional component, so particular sounds are perceived by the listener as corning from a particular direction. A sense of distance—how close or far the listener is from the apparent (virtual) source of the sound—can also be incorporated into the audio information. This can be applicable for any customer interacting with a vehicle operating in an autonomous driving mode, as well as situations in which the rider has visual or hearing impairments, or even safety concerns. Users may have different wayfinding preferences and needs, which can be addressed using one or more tools that address any gaps in each unique rider's wayfinding journey. Instead of making hardware changes to the autonomous vehicles, which can be expensive and time consuming, spatial audio can be employed on client-side devices without necessitating any additional hardware requirements.

Thus, according to one aspect of the technology, audio cues or other spatial audio information is provided to a user via earbuds or other headphones worn by the user. The spatial audio gives the user direction information, for instance to replicate a horn honk to make it sounds as though it is coming from the actual direction of a particular vehicle, without that vehicle having to honk its horn. In addition to helping the user locate the vehicle, such as for a pickup or to get a delivery, this approach can also be used when the rider is in the vehicle prior to exiting. For instance, spatial audio can be provided to the rider to give them contextual information about the environment outside the vehicle prior to exiting, such as whether a bicyclist is approaching on the side they will be exiting. This contextual information can alert the rider to wait or otherwise be more situationally aware when departing the vehicle.

Aspects of the technology include a computer-implemented method that comprises estimating, by one or more processors, a current location of a user; identifying, by the one or more processors, an actual location of a vehicle or a pickup location associated with the vehicle; estimating, by the one or more processors, a pose of the user relative to the actual location of the vehicle or the pickup location; selecting, by the one or more processors, a sound; generating, by the one or more processors based on the selected sound, a spatial audio signal, the spatial audio signal having a directional component according to the estimated pose of the user relative to the actual location of the vehicle or the pickup location: and providing the spatial audio signal for presentation to the user via headphones worn by the user.

Estimating the pose of the user relative to the actual location of the vehicle or the pickup location may be based on sensor information received from the headphones. Here, the sensor information may be obtained from a gyroscope of the headphones, or, alternatively or additionally, may be obtained from a magnetometer of the headphones. Providing the spatial audio signal for presentation to the user via the headphones may include transmitting the spatial audio signal from a client device of the user to the headphones. In this case, estimating the pose of the user relative to the actual location of the vehicle or the pickup location may be based on sensor information obtained by the client device.

Estimating the pose of the user relative to the actual location of the vehicle or the pickup location may be based on perception information received from the vehicle. The spatial audio signal may further include a loudness component to indicate a relative distance between the current location of the user and the actual location of the vehicle or the pickup location associated with the vehicle. Generating the spatial audio signal may include generating a three-dimensional scene based on the current location of the user or the actual location of the vehicle or pickup location. Here, the three-dimensional scene may include one or more objects in an environment of the user. The method may further comprise varying a directional accuracy of the spatial audio signal based on a relative distance between the user and the actual location of the vehicle or the pickup location. The method may further comprise generating turn-by-turn directions for the user to the vehicle or to the pickup location, in which the spatial audio signal is configured to play concurrently with the turn-by-turn directions. The sound may be selected based on at least one of user preference, ambient noise or object type.

Each of the above variations may be implemented together in any combination, unless otherwise expressly indicated.

In another aspect, a computing device is provided to implement any of the above combinations of the method. The computing device includes memory storing a set of sounds and one or more processors operatively coupled to the memory. The one or, more processors are configured to: estimate a current location of a user; identify an actual location of a vehicle or a pickup location associated with the vehicle; estimate a pose of the user relative to the actual location of the vehicle or the pickup location; select a sound from the set of sounds in the memory; generate, based on the selected sound, a spatial audio signal, the spatial audio signal having a directional component according to the estimated pose of the user relative to the actual location of the vehicle or the pickup location; and provide the spatial audio signal for presentation to the user via headphones worn by the user.

According to a further aspect, a computer-implemented method includes identifying, by one or more processors of a vehicle, an actual location of the vehicle; detecting, by a perception system of the vehicle, a presence of an object in a vicinity of the vehicle; based on detecting the presence of the object in the vicinity of the vehicle, selecting a sound; generating, based on the selected sound, a spatial audio signal, the spatial audio signal having a directional component according to the actual location of the vehicle and a relative position of the object in the vicinity of the vehicle; and providing the spatial audio signal for presentation to a rider within the vehicle.

The spatial audio signal may indicate a type of the object. The spatial audio signal may indicate a side of the vehicle to exit. The spatial audio signal may indicate a door of the vehicle to exit. The spatial audio signal may further include a loudness component to indicate a relative distance between the actual location of the vehicle and a location of the object in the vicinity of the vehicle. In this case, the method may further comprise varying the loudness component based on a relative distance between the object and the vehicle. The spatial audio signal may verbally indicate a type of the object. The spatial audio signal may be provided in conjunction with an assistant feature that identifies a certain location or a certain landmark. The spatial audio signal may provide information about a trip taken by the rider in the vehicle.

Each of the above variations may be implemented together in any combination, unless otherwise expressly indicated.

In another aspect, a vehicle is configured to operate in an autonomous driving mode. The vehicle comprises a perception system, a driving system, a positioning system and a control system. The perception system includes one or more sensors, the one or more sensors being configured to receive sensor data associated with objects in an external environment of the vehicle and detect a presence of an object in a vicinity of the vehicle. The driving system includes a steering subsystem, an acceleration subsystem and a deceleration subsystem to control driving of the vehicle. The positioning system is configured to identify an actual location of the vehicle. The control system includes one or more processors, and is operatively coupled to the driving system, the perception system and the positioning system. The control system is configured to: based on detecting the presence of the object in the vicinity of the vehicle, select a sound: generate, based on the selected sound, a spatial audio signal, the spatial audio signal having a directional component according to the actual location of the vehicle and a relative position of the object in the vicinity of the vehicle: and provide the spatial audio signal for presentation to a rider within the vehicle. The vehicle may implement any of the features of the above-described method.

BRIEF DESCRIPTION OF THE DRAWINGS

FIG. 11 illustrates an example method in accordance with aspects of the technology, FIG. 12 illustrates another example method in accordance with aspects of the technology.

DETAILED DESCRIPTION

Wayfinding involves providing information to riders or other users, for instance to find where their vehicle is parked, to go to a specific location to wait for their vehicle, or to exit the vehicle upon arrival in order to get to their destination. Wayfinding in complex environments, such as dense urban areas or during rush hour, can present a particular challenge for riders with vision and cognitive disabilities, but may also affect riders with hearing and ambulatory disabilities or riders with no disabilities at all. Other users such as customers receiving a package, groceries or a food delivery, or a store employee that needs to put those items in the vehicle so they can be delivered, can also encounter wayfinding difficulties.

Autonomous vehicle systems consider safety, applicable traffic laws, and other constraints when selecting where the vehicle should pull over, and this can sometimes result in counterintuitive pickup and drop-off locations for the rider or other user. For example, the vehicle may pull over farther down the road than expected, behind a building, or on the opposite side of the street from the rider, or the planned destination. Since the rider of a fully autonomous vehicle cannot communicate with an in-vehicle human driver or ask them to adjust the pullover, it can be inconvenient or challenging for the rider to find the vehicle or desired destination at pickup or drop-off.

Aspects of the technology incorporate spatial audio features that enhance wayfinding to provide suitable assistance to a diverse group of riders or other users in a variety of situations. For instance, spatial audio-based wayfinding can enable autonomous vehicle riders with disabilities to quickly and easily find their vehicle at pickup and their destination at drop-off. As a result, this approach to way riding can help to provide greater independence and freedom of mobility for these riders. Such features can also enhance the in-vehicle experience for riders. This may include providing information about the trip or the vehicle itself, including providing situational awareness of vehicles, bicyclists or other objects near the vicinity of the vehicle that can impact a rider's departure from the vehicle.

Spatial audio can include using dynamic head tracking to generate audio that appears to conic from a certain direction (e.g., the user hears a car honking coming from their right side and as they move their head to the right, the audio adjusts accordingly). For instance, instead of honking the vehicle's horn, this directional information could be provided only in a user's headphones. This would reduce ambient noise in the vehicle's driving environment while helping to direct the user to the vehicle based on the audio spatial mapping.

Example Vehicle Systems

Figure 1A:
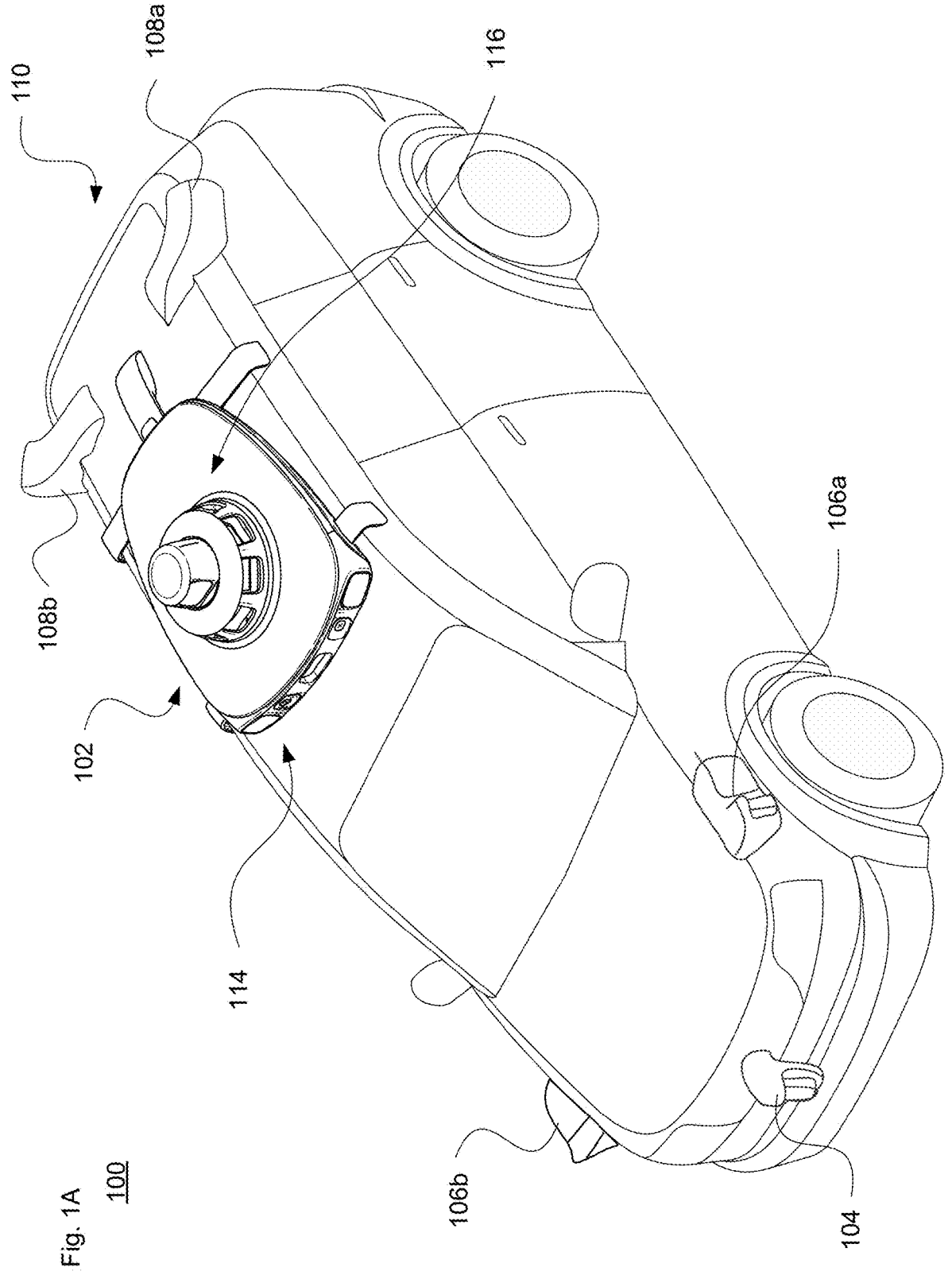
FIGS. 1A-B illustrate example self-driving vehicles in accordance with aspects of the technology.
Figure 1B:
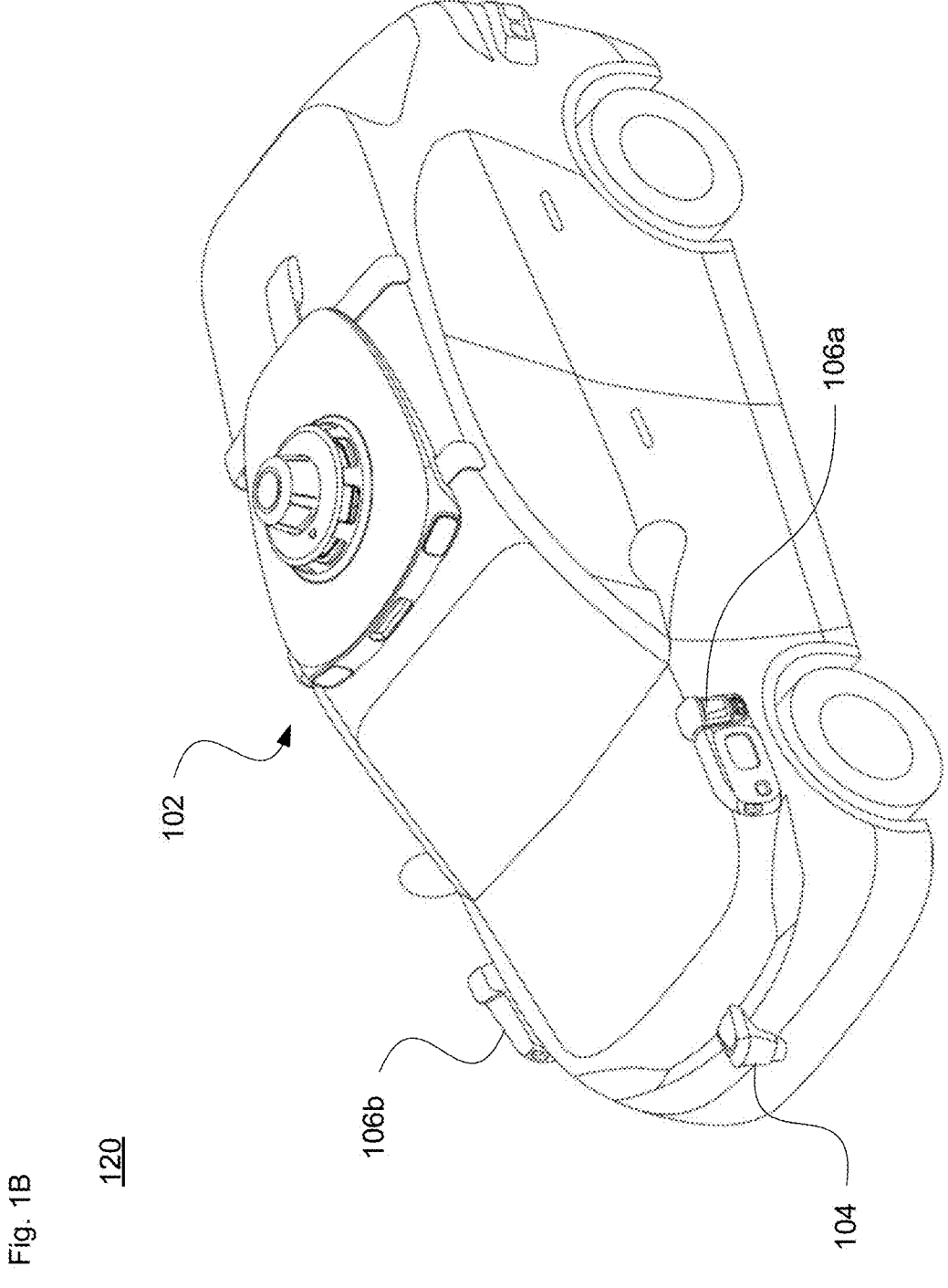
Figure 1C:
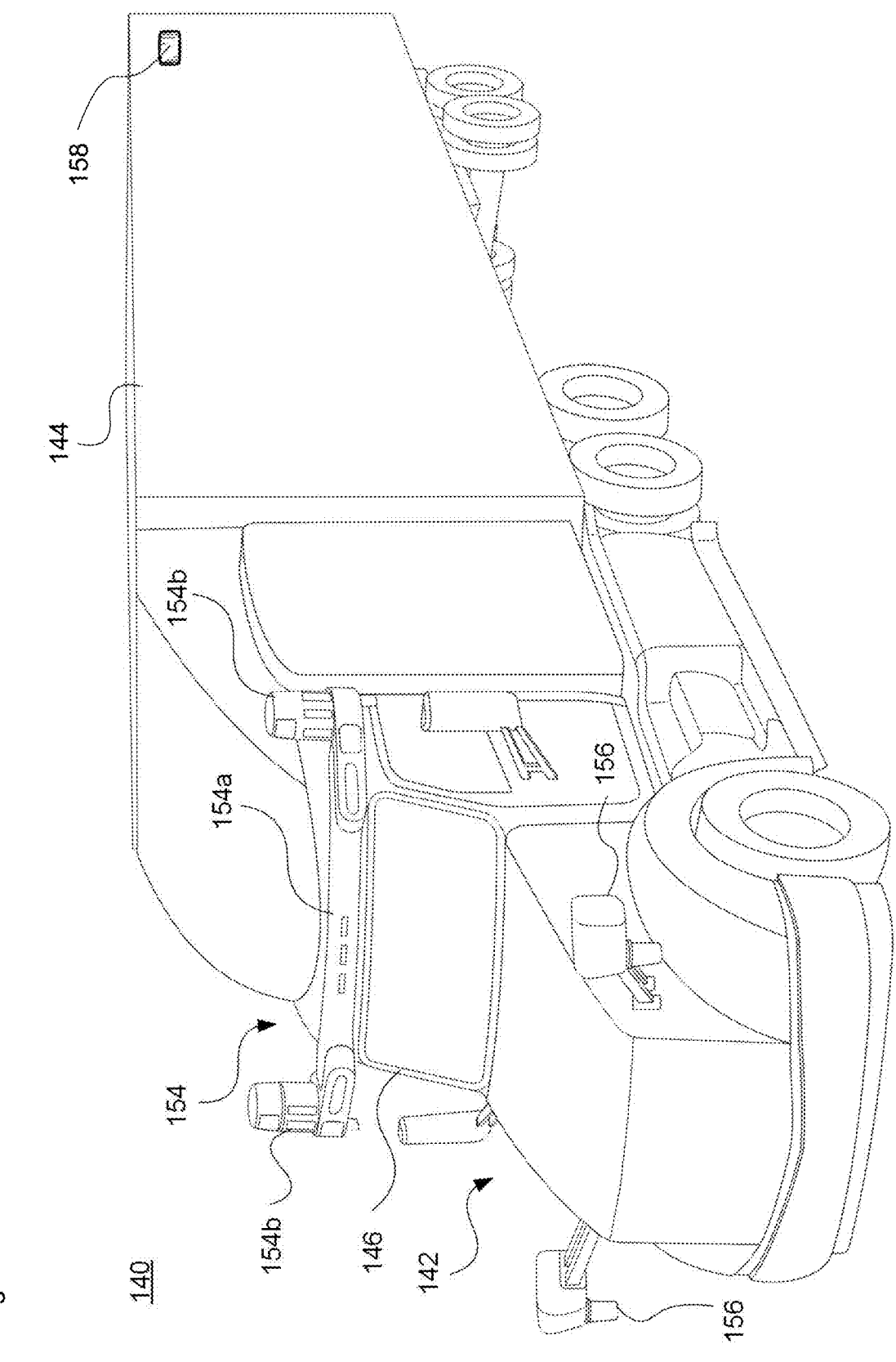
FIGS. 1C-E illustrate example cargo and delivery type vehicles configured for use with aspects of the technology.
Figure 1D:
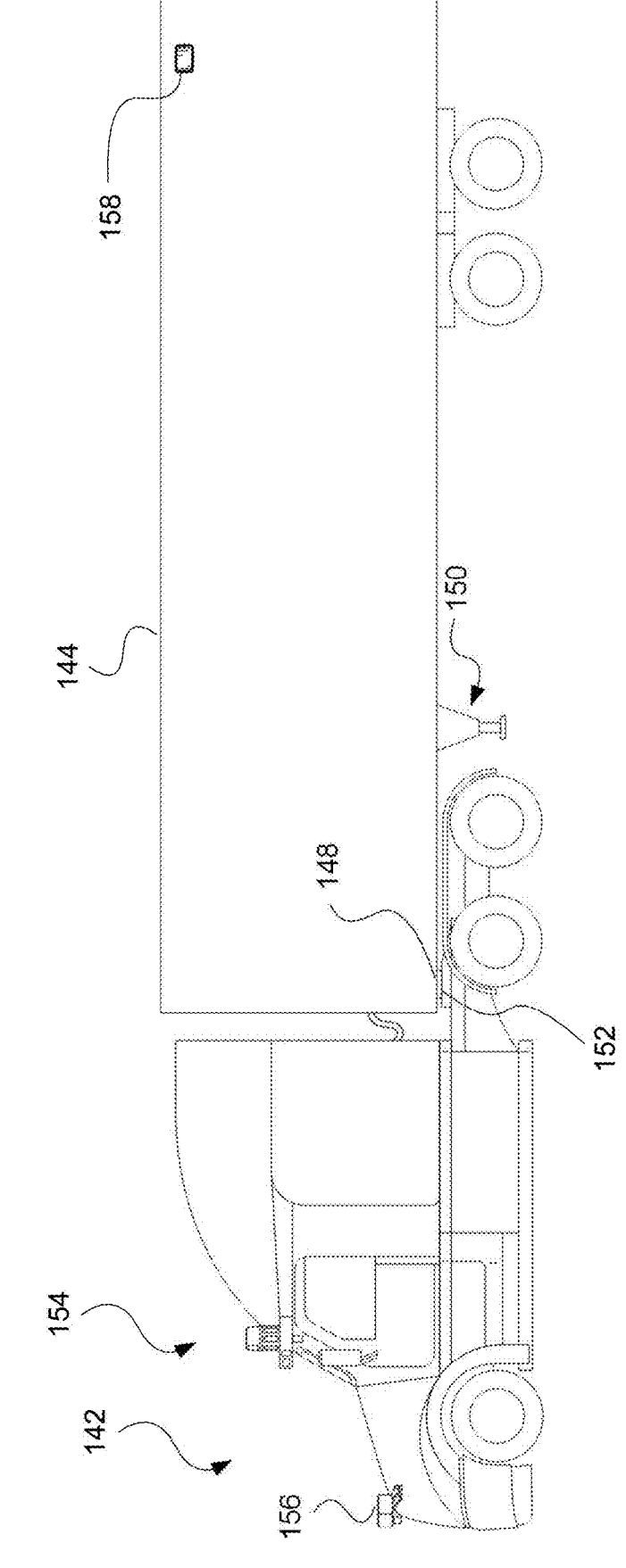
Figure 1E:
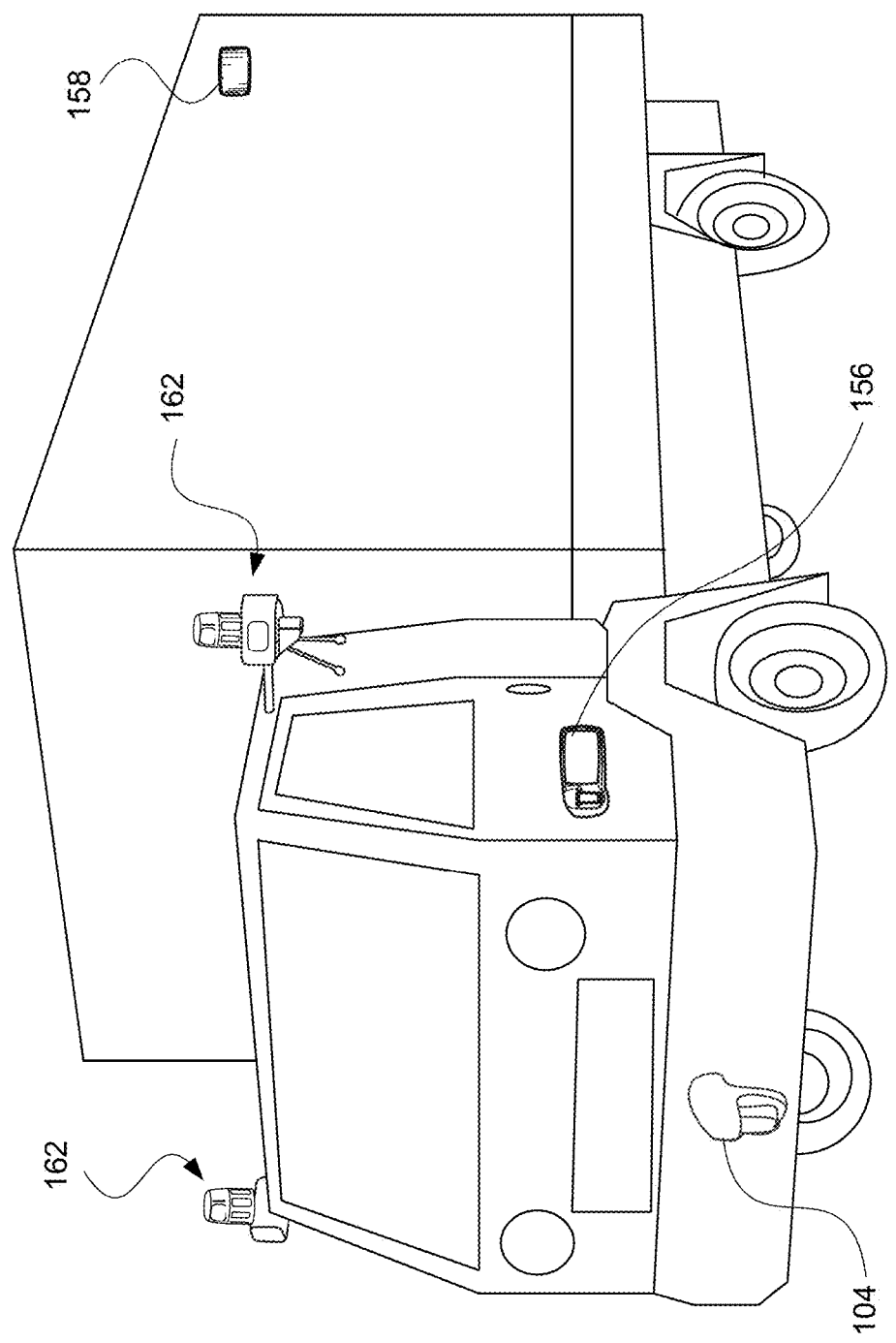

FIG. 1A illustrates a perspective view of an example passenger vehicle 100, such as a minivan or sport utility vehicle (SUV). FIG. 1B illustrates a perspective view of another example passenger vehicle 120, such as a sedan or crossover. The passenger vehicles may include various sensors for obtaining information about the vehicle's external environment. FIGS. 1C-D illustrate an example tractor-trailer type cargo vehicle 140. And FIG. 1E illustrates a smaller cargo vehicle 160, such as a panel truck for local deliveries.

Vehicles, such as those described herein, may be configured to operate in one or more different driving modes. For instance, in a manual driving mode, a driver may directly control acceleration deceleration, and steering via, inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each defined different levels of automated driving to indicate how much, or how little, a vehicle controls the driving, although different organizations may categorize the levels differently. For example, under current SAE classifications, there may be up to six levels (e.g., Level 0 through Level 5). In the lower SAE levels, the human driver is supported by various automated features such as emergency braking, blind spot or lane departure warning, lane centering and/or adaptive cruise control; however, the human driver must continuously oversee such features. In higher SAE levels, the human driver does not control certain (or all) driving features.

As described herein, in a semi or partially autonomous driving mode, even though the vehicle assists with one or more driving operations (e.g., steering, braking and/or accelerating to perform lane centering, adaptive cruise control, advanced driver assistance system (ADAS) or emergency braking), the human driver is expected to be situationally aware of the vehicle's surroundings and supervise the assisted driving operations. Here, even though the vehicle may perform all driving tasks in certain situations, the human driver is expected to be responsible for taking control as needed. In contrast, in a fully autonomous driving mode, the control system of the vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode. The technology may be employed in all manner of vehicles configured to operate in an autonomous driving mode, including vehicles that transport passengers or items such as food deliveries, packages, cargo, etc. While certain aspects of the disclosure are particularly useful in connection with specific types of vehicles, the vehicle may be any type of passenger or commercial vehicle including, but not limited to, cars (e.g., couples, sedans, minivans, vans, sport utility vehicles, shuttles, etc.), trucks (e.g., light duty such as classes 1-3, medium duty such as classes 4-6, and heavy duty trucks such, as classes 7-8), motorcycles, buses, recreational vehicles, or special purpose vehicles (e.g., low speed vehicles, street cleaning, sweeping vehicles, garbage trucks, emergency vehicles, etc.).

For instance, as shown in FIG. 1A, the vehicle may include a roof-top housing unit (roof pod assembly) 102 may include one or more lidar sensors as well as various cameras (e.g., optical or infrared), radar units, acoustical sensors e.g., microphone or sonar-type sensors, ultrasonic sensors, or the like), inertial (e.g., accelerometer, gyroscope, etc.) or other sensors (e.g., positioning sensors such as GPS sensors). Housing unit 102 may have any number of different configurations, such as domes, cylinders "cake-top" shapes, etc. Housing 104, located at the front end of vehicle 100, and housings 106a, 106b on the driver's and passenger's sides of the vehicle may each incorporate lidar, radar, camera, acoustical and/or other sensors. For example, housing 106a may be located in front of the driver's side door along a quarter panel of the vehicle. As shown, the passenger vehicle 100 also includes housings 8a, 108b for, e.g., radar units, lidar and/or cameras also located towards the rear roof portion of the vehicle. Additional lidar, radar units and/or cameras (not shown) may be located at other places along the vehicle 100. For instance, arrow 110 indicates that a sensor unit (not shown) may be positioned along the rear of the vehicle 100, such as on or adjacent to the bumper. Depending on the vehicle type and sensor housing configuration(s), acoustical sensors may be disposed in any or all of these housings around the vehicle.

In this example, arrow 114 indicates that the roof pod 102 as shown includes a base section coupled to the roof of the vehicle. And arrow 116 indicated that the roof pod 102 also includes an upper section (e.g., with the dome, cylinder or cake-top shape) raised above the base section. Each of the base section and upper section may house different sensor units configured to obtain information about objects and conditions in the environment around the vehicle. The roof pod 102 and other sensor housings may also be disposed along vehicle 120 of FIG. 1B. By way of example, each sensor unit may include one or more sensors of the types described above, such as lidar, radar, camera (e.g., optical or infrared), acoustical (e.g., a passive microphone or active sound emitting sonar-type sensor), inertial (e.g., accelerometer, gyroscope, etc.) or other sensors (e.g., positioning sensors such as GPS sensors).

The example cargo vehicle 140 of FIGS. 1C-D is a tractor-trailer truck, e.g., a class 7 or class 8 vehicle based on gross vehicular weight rating (GVWR). The truck may include, e.g., a single, double or triple trailer, or may be another medium or heavy-duty truck such as in commercial weight classes 4 through 8. As shown, the truck includes a tractor unit 142 and a single cargo unit or trailer 144. The trailer 144 may be fully enclosed, open such as a flat bed, or partially open depending on the type of goods or other cargo to be transported. In this example, the tractor unit 14-2 includes the engine and steering systems (not shown) and a cab 146 for a driver and any passengers.

As seen in, the side view of FIG. ID, the trailer 144 includes a hitching point, known as a kingpin, 148, as well as landing gear 150 for when the trailer is detached from the tractor unit. The kingpin 148 is typically formed as a solid steel shaft, which is configured to pivotally attach to the tractor unit 142. In particular, the kingpin 148 attaches to a trailer coupling 152, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor may have one or more sensor units 154 and 156 disposed therealong. For instance, sensor unit 154 may be disposed on a roof or top portion of the cab. The sensor unit 154 may be a sensor suite having an elongated central member 154a with one or more types of sensors located therealong (e.g., camera and/or radar modules) and side members 154b that may include other sensor types (e.g., short range lidar modules capable of detecting objects within 10-25 meters of the vehicle and/or long range lidar modules capable of detecting objects beyond 15-20 meters and up to 100-250 meters). Sensor units 156 may be disposed on left and/or right sides of the cab. Sensor units may also be located along other regions of the cab, such as along the front bumper or hood area, in the rear of the cab, adjacent to the fifth-wheel, underneath the chassis, etc. The trailer 144 may also have one or more sensor units 158 disposed therealong, for instance along one or both side panels, front, rear, roof and/or undercarriage of the trailer 144.

The perspective view 160 of FIG. 1E illustrates an example panel truck or other vehicle that may be suitable for local deliveries (e.g., groceries, meals, mail or other packages, etc.), such as a light truck in classes 1-3 or a medium truck in classes 4-6 based on GVWR. Here, in contrast to the roof-top housing unit 154 shown in FIGS. 1C-D, the truck 160 may have a pair of sensor assemblies disposed in housings 162 on either side of the vehicle.

As with the sensor units of the passenger vehicles of FIGS. 1A-B, each sensor unit of the truck may include one or more sensors, such as lidar, radar, camera (e.g., optical or infrared), acoustical (e.g., microphone or sonar-type sensor), inertial (e.g., accelerometer, gyroscope, etc.) or other sensors such as geolocation-based (e.g., GPS) positioning sensors, load cell or pressure sensors (e.g., piezoelectric or mechanical), inertial (e.g., accelerometer, gyroscope, etc.).

Figure 2:
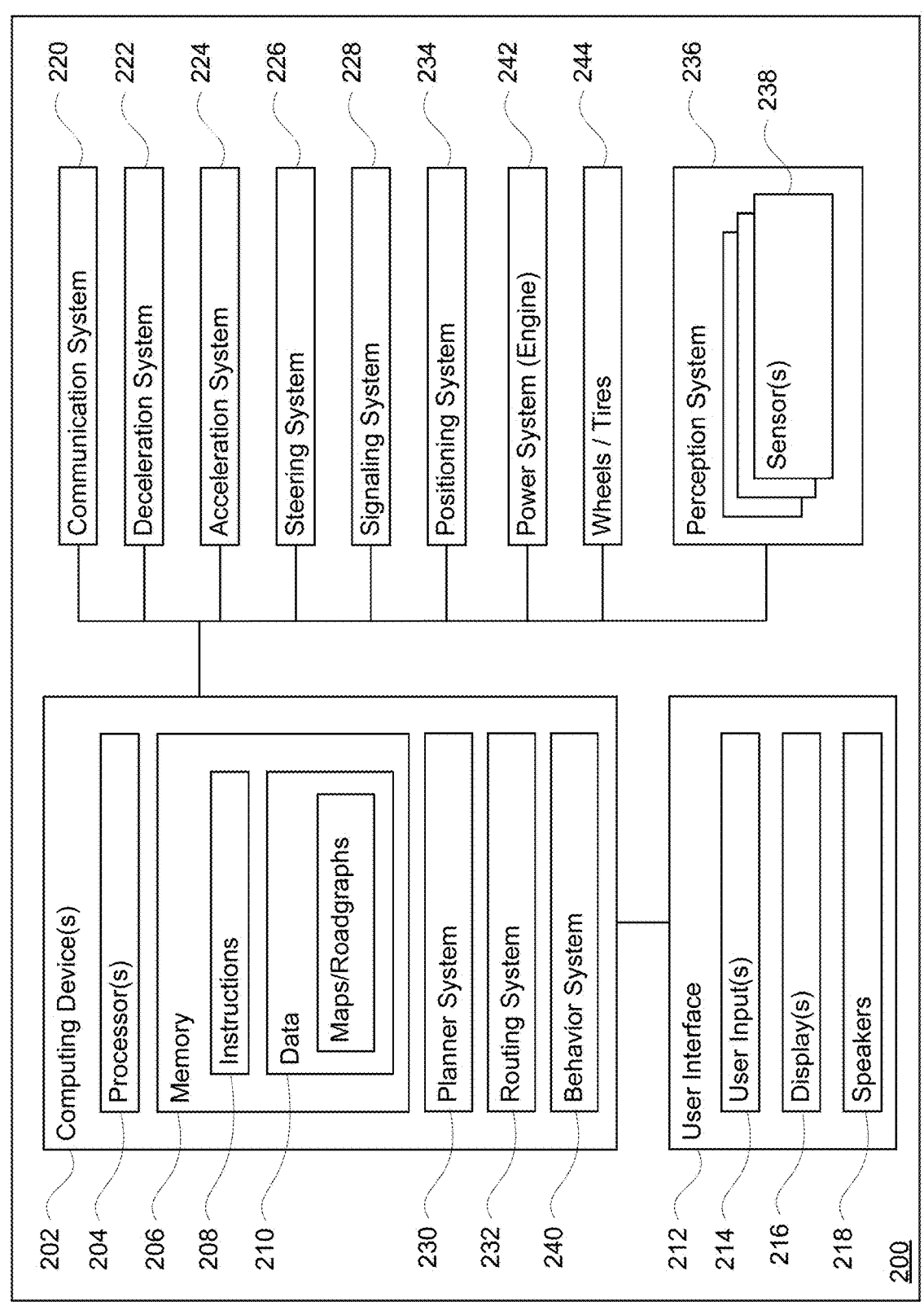
FIG. 2 illustrates components of a self-driving vehicle in accordance with aspects of the technology.

As shown in system diagram 200 of FIG. 2, the vehicle such as vehicle 100, 120 or 160 may have one or more computing devices, such as computing device 202 containing one or more processors 204, memory 206 and other components typically present in general purpose computing devices.

The memory 206 stores information accessible by the one or more processors 204, including and instructions 208 and data 210 that may be executed or otherwise used by the processor(s) 204. The memory 206 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 210 may be retrieved, stored or modified by processor 204 in accordance with the instructions 208. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 204 may be any conventional processors, such as commercially available CPUs, GPUs or TPUs. Alternatively, the one or more processors may include a dedicated device such as an ASIC or other hardware-based processor. Although FIG. 2 functionally illustrates the processor, memory, and other elements of computing device 202 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 202. Accordingly, references to a processor or computing device will be understood to include references to a collection of processors or computing devices or memories that may or may not operate in parallel.

Computing devices 202 may include all of the components normally used in connection with a computing device such as the processor and memory described above as well as a user interface 212 having one or more user inputs 214 (e.g., one or more of a button, mouse, keyboard, touch screen, gesture input and/or microphone), various electronic displays 216 (e.g., a monitor having a screen or any other electrical device that is operable to display information), and speakers 218 to provide information to a passenger of the autonomous vehicle or other people as needed. For example, electronic display 216 may be located within a cabin of autonomous vehicle 100, 120 or 160 and may be used by computing, devices 202 to provide information to passengers or delivery personnel within the autonomous vehicle 100, 120 or 160.

Computing devices 202 may also include a communication system 220 having one or more wireless connections to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies. Ethernet, WiFi and HTTP, and various combinations of the foregoing.

Computing devices 202 may be part of an autonomous control system for the autonomous vehicle 100, 120 or 160 and may be capable of communicating with various components of the vehicle in order to control the vehicle in an autonomous driving mode. For example, computing devices 202 may be in communication with various systems of autonomous vehicle 100, 120 or 160, such as deceleration system 222, acceleration system 224, steering system 226, signaling system 228, planning system 230 (also referred to as a planning/trajectory module), routing system 232, positioning system 234 (for determining the position of the vehicle such as its pose, e.g., position and orientation along the roadway or pitch, yaw and roll of the vehicle chassis relative to a coordinate system), perception system 236 having one or more sensors 238, behavior modeling system 240 (also referred to as a behavior module), and power system 242 in order to control the movement, speed, etc. of autonomous vehicle 100, 120 or 160 in accordance with the instructions 208 of memory 206 in the autonomous driving mode.

As an example, computing devices 202 may interact with deceleration system 222 and acceleration system 224 in order to control the speed of the vehicle. Similarly, steering system 226 may be used by computing devices 202 in order to control the direction of autonomous vehicle 100, 120 or 160. For example, if autonomous vehicle 100, 120 or 160 is configured for use on a road, such as a car or truck, steering system 226 may include components to control the angle of wheels 244 to turn the vehicle. Some or all of the wheels/tires 244 are coupled to deceleration, acceleration and/or steering systems. The computing devices 202 may be able to receive information about tire pressure, balance and other factors that may impact driving in an autonomous mode. Computing devices 202 may also use the signaling system 228 in order to signal the vehicle's intent to other drivers or vehicles, for example, by lighting turn signals or brake lights when needed.

Routing system 232 may be used by computing devices 202 in order to generate a route to a destination using map information. Planning system 230 may be used by computing device 202 in order to generate short-term trajectories that allow the vehicle to follow routes generated by the routing system. In this regard, the planning system 230 and/or routing system 232 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device, as such as the computing devices discussed below or other computing devices), pullover spots, vegetation, or other such objects and information.

The map information may be configured as a roadgraph. The roadgraph may include a plurality of graph nodes and edges representing features such as crosswalks, traffic lights, road signs, road or lane segments, etc., that together make up the road network of the map information. Each edge is defined by a starting graph node having a specific geographic location (e.g., latitude, longitude, altitude, etc.), an ending graph node having a specific geographic location (e.g., latitude, longitude, altitude, etc.), and a direction. This direction may refer to a direction the autonomous vehicle 100 must be moving in in order to follow the edge (i.e., a direction of traffic flow). The graph nodes may be located at fixed or variable distances. For instance, the spacing of the graph nodes may range from a few centimeters, to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 232 may use the aforementioned map information to determine a route from a current location (e.g., a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g., because it is faster) and therefore be preferable.

Positioning system 234 may be used by computing devices 202 in order to determine the vehicle's relative or absolute position on a map or on the earth. For example, the positioning system 234 may include a GPS receiver or to determine the device's latitude, longitude and/or altitude position. Other location systems such as laser-based localization systems, inertial-aided GPS, or camera-based localization may also be used to identify the location of the vehicle. The location of the vehicle may include an absolute geographical location such as latitude, longitude, and altitude, a location of a node or edge of a roadgraph as well as relative location information, such as location relative to other cars immediately around it, which can often be determined with less noise than the absolute geographical location.

The positioning system 234 may also include other devices in communication with computing devices 202, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 236 includes one or more components (sensors 238) for detecting objects external to the vehicle such as other road users (vehicles, pedestrians, bicyclists, etc.) obstacles in the roadway, traffic signals, signs, trees, buildings, etc. For example, the sensors 238 of the perception system 236 may include lidar, sonar, radar, cameras, microphones (e.g., in an acoustical array for instance arranged along the roof pod 102), pressure or inertial sensors, strain gauges, and/or any other detection devices that generate and/or record data which may be processed by the computing devices of computing devices 202. In the case where the vehicle is a passenger vehicle such as a minivan 100 or car 120, the vehicle may include lidar, cameras, and/or other sensors mounted on or near the roof, fenders, bumpers or other locations as shown in FIGS. 1A-B.

Such sensors of the perception system 236 may detect objects in the vehicle's external environment and their characteristics such as location, orientation (pose) relative to the roadway, size, shape, type (for instance, vehicle, pedestrian, bicyclist, etc.), heading, speed of movement relative to the vehicle, etc., as well as environmental conditions around the vehicle. The perception system 236 may also include other sensors within the vehicle to detect objects and conditions within the vehicle, such as in the passenger compartment or storage compartment (e.g., trunk). For instance, such sensors may detect one or more persons, pets, packages, etc., as well as conditions within and/or outside the vehicle such as temperature, humidity, etc. Still further, sensors 238 of the perception system 234 may measure the rate of rotation of the wheels 244, an amount or a type of braking by the deceleration system 222, and other factors associated with the equipment of the vehicle itself.

The raw data obtained by the sensors (e.g., camera imagery, lidar point cloud data, radar return signals, acoustical information, etc.) can be processed by the perception system 236 and/or sent for further processing to the computing devices 202 periodically or continuously as the data is generated by the perception system 236. Computing devices 202 may use the positioning system 234 to determine the vehicle's location and perception system 236 to detect and respond to objects and roadway information (e.g., signage or road markings) when needed to reach the location safely, such as by adjustments made by planner/trajectory module 230, including adjustments in operation to deal with sensor occlusions and other issues.

In some instances, object characteristics may be input into a behavior prediction system software module of the behavior modeling system 240 which uses various behavior models based on object type to output one or more predicted future behaviors for a detected object. Object trajectories may be a list of positions and orientations or headings (e.g., poses) as well as other predicted characteristics such as speed, acceleration or deceleration, rate of change of acceleration or deceleration, etc. In other instances, the characteristics obtained from the perception system 236 may be put into one or more detection system software modules, such as a traffic light detection system software module configured to detect the states of known traffic signals, construction zone detection system software module configured to detect construct on zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle.

Detected objects, predicted future behaviors, various likelihoods from detection system software modules, the map information identifying the vehicle's environment, position information from the positioning system 234 identifying the location and orientation of the vehicle, a destination location or node for the vehicle as well as feedback from various other systems of the vehicle may be input into a planning system software module of the planner system 230. The planner system 230 may use this input to generate trajectories for the vehicle to follow for some brief period of time into the future based on, a route generated by a routing module of the routing system 232. In this regard, the trajectories may define the specific characteristics of acceleration, deceleration, speed, direction, etc. to allow the vehicle to follow the route towards reaching a destination. A control system software module of computing devices 202 may be configured to control movement of the vehicle, for instance by controlling braking, acceleration and steering of the vehicle, in order to follow a trajectory.

The computing devices 202 may control the vehicle in one or more of the autonomous driving modes by controlling various components. For instance, by way of example, computing devices 202 may navigate the vehicle to a destination location completely autonomously using data from the detailed map information and planner system 230. Computing devices 202 may use the positioning system 234 to determine the vehicle's location and perception system 236 to detect and respond to objects when needed to reach the location safely. Again, in order to do so, computing device 202 and/or planner system 230 may generate trajectories and cause the vehicle to follow these trajectories, for instance, by causing the vehicle to accelerate (e.g., by supplying fuel or other energy to the engine or power system 242 by acceleration system 224), decelerate (e.g., by decreasing the fuel supplied to the engine or power system 242, changing gears, author by applying brakes by deceleration system 222), change direction (e.g., by turning the front or rear wheels of autonomous vehicle 100, 120 or 160 by steering system 226), and signal such changes (e.g., by lighting turn signals) using the signaling system 228. Thus, the acceleration system 224 and deceleration system 222 may be part of a drivetrain that includes various components between an engine of the vehicle and the wheels of the vehicle. Again, by controlling these systems, computing devices 202 may also control the drivetrain of the vehicle in order to maneuver the vehicle autonomously.

Figure 3A:
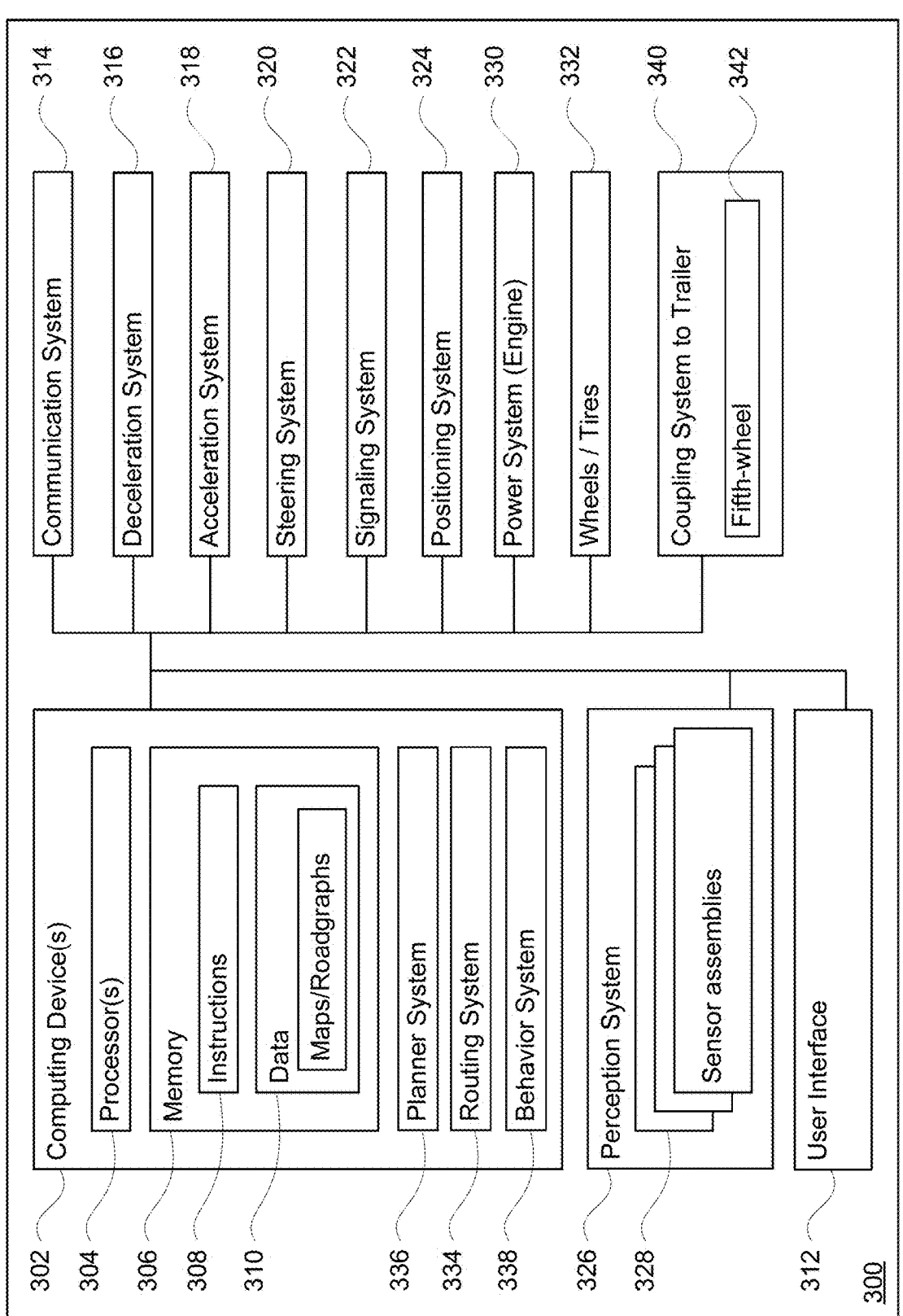
FIGS. 3A-B are block diagrams of systems of an example cargo-type vehicle in accordance with aspects of the technology.

FIG. 3A illustrates a block diagram 300 with various components and systems of a vehicle, e.g., vehicle 140 of FIGS. 1C-D. By way of example, the vehicle may be a heavy cargo truck, farm equipment or construction equipment, configured to operate in one or more autonomous modes of operation. As shown in die block diagram 300, the vehicle includes a control system of one or more computing devices, such as computing devices 302 containing one or more processors 304, memory 306 and other components similar or equivalent to components 202, 204 and 206 discussed above with regard to FIG. 2. For instance, the data may include map-related information (e.g., roadgraphs).

The control system may constitute an electronic control unit (ECU) of a tractor unit of a cargo vehicle. As with instructions 208, the instructions 308 may be any set of instructions to be executed directly (such as machine code) or indirectly (such as scripts) by the processor. Similarly, the data 310 may be retrieved, stored or modified by one or more processors 304 in accordance with the instructions 308.

Here, as above, the system may include a user interface 312 having one or more user inputs, various electronic displays, and speakers.

In one example, the computing devices 302 may form an autonomous driving computing system incorporated into vehicle 140. Similar to the arrangement discussed above regarding. FIG. 2, the autonomous driving computing system of block diagram 300 may be capable of communicating with various components of the vehicle in order to perform route planning and driving operations. Communication system 314 may provide one or more wireless connections in the manner described above for communication system 220. In addition or alternatively, the communication system may include the vehicle's internal communication bus (e.g., a Controller Area Network (CAN) bus or a FlexRay bus).

For example, the computing devices 302 may be in communication with various systems of the vehicle, such as a driving system including a deceleration system 316, acceleration system 318, steering system 320, signaling system 322, and a positioning system 324, each of which may function as discussed above regarding FIG. 2.

The computing devices 302 are also operatively coupled to a perception system 326 having one or more Sensor assemblies 328, as well as a power system 330. Some or all of the wheels/tires 332 are coupled to the driving system, and the computing devices 202 may be able to receive information about tire pressure, balance, rotation rate and other factors that may impact driving in an autonomous mode. As with computing devices 202, the computing devices 302 may control the direction and speed of the vehicle by controlling various components. By way of example, computing devices 302 may navigate the vehicle to a destination location completely autonomously using data from the map information, routing system 334, planner system 336 and/or behavior system 338. For instance, computing devices 302 may employ a planner/trajectory module of the planner system 336 in conjunction with the positioning system 324, the sensor assemblies 328 of the perception system 326 and the routing system 334 to detect and respond to objects when needed to reach the location safely, similar to the manner described above for FIG. 2.

Similar to perception system 236, the perception system 326 also includes one or more sensors or other components such as those described above for detecting objects external to the vehicle, objects or conditions internal to the vehicle, and/or operation of certain vehicle equipment such, as the wheels and driving system. Each sensor assembly 328 may include one of more sensors. In one example, a pair of sensor assemblies 328 may be arranged as sensor towers integrated into the side-view mirrors on the truck, farm equipment, construction equipment or the like. In another example, sensor assemblies 328 may also be positioned at different locations on the tractor unit 142 or on the trailer 144, as noted above with regard to FIGS. 1C-D. The computing devices 302 may communicate with the sensor assemblies located on both the tractor unit 142 and the trailer 144. Each assembly may have one or more types of sensors such as those described above.

Also shown in FIG. 3A is a coupling system 340 for connectivity between the tractor unit and the trailer. The coupling system 340 may include one or more power and/or pneumatic connections (not shown), and a fifth-wheel 342 at the tractor unit for mechanical connection to the kingpin at the trailer.

Figure 3B:
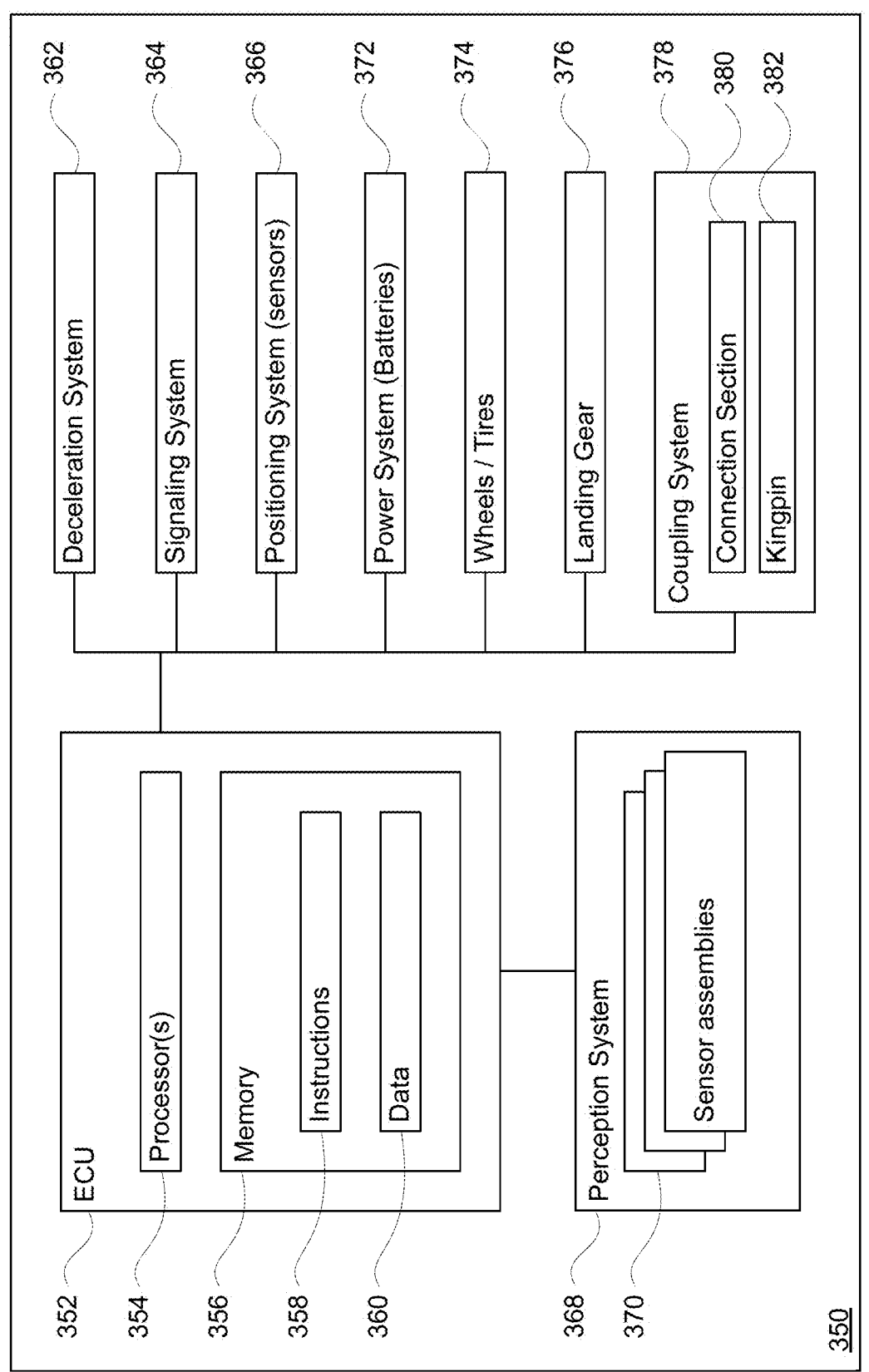

FIG. 3B illustrates a block diagram 350 of systems of an example trailer, such as trailer 144 of FIGS. 1C-D. As shown in this example, the system includes a trailer ECU 352 of one or more computing devices, such as computing devices containing one or more processors 354, memory 356 and other components typically present in general purpose computing devices. The memory 356 stores information accessible by the one or more processors 354, including instructions 358 and data 360 that may be executed or otherwise used by the processor(s) 354. The descriptions of the processors, memory, instructions and data from FIGS. 2 and 3A apply to these elements of FIG. 3B.

The trailer ECU 352 in this example is configured to receive information and control signals, from the tractor unit, as well as information from various trailer components. The on-board processors 354 of the ECU 352 may communicate with various systems of the trailer, including a deceleration system 362, signaling system 364, and a positioning system 366. The ECU 352 may also be operatively coupled to a perception system 368 with one or more sensors arranged in sensor assemblies 370 for detecting objects in the trailer's driving environment. The ECU 352 may also be operatively coupled with a power system 372 (for example, a battery power supply) to provide power to local components. Some or all of the wheels/tires 374 of the trailer may be coupled to the deceleration system 362, and the processors 354 may be able to receive information about tire pressure, balance, wheel speed and other factors that may impact driving in an autonomous mode, and to relay that information to the processing system of the tractor unit. The deceleration system 362, signaling system 364, positioning system 366, perception system 368, power system 372 and wheels/tires 374 may operate in a manner such as described above with regard to FIGS. 2 and 3A.

The trailer also includes a set of landing gear 376, as well as a coupling system 378. The landing gear may provide a support structure for the trailer when decoupled from the tractor unit. The coupling system 378, which may be a part of coupling system 340 of FIG. 3A, provides connectivity between the trailer and the tractor unit. Thus, the coupling system 378 may include a connection section 380 (e.g., for communication, power and/or pneumatic links to the tractor unit). In this example, the coupling system also includes a kingpin 382 configured for connectivity with the fifth-wheel of the tractor unit.

Example Implementations

As noted above, there are various types of situations in which spatial audio-based wayfinding can be beneficial to riders or other users of an autonomous vehicle service.

Locating a Vehicle

A primary situation involves guiding the user to the vehicle. This can be where the vehicle is currently parked. Or, alternatively, this could be where the vehicle will be meeting the user, such as when the vehicle is about to arrive at a pickup spot. In a further situation, the technology can be utilized to help navigate to a user's desired drop-off location, such as guiding them from the vehicle to a particular entrance of a hotel, store, office building, airport or train station.

Figure 4:
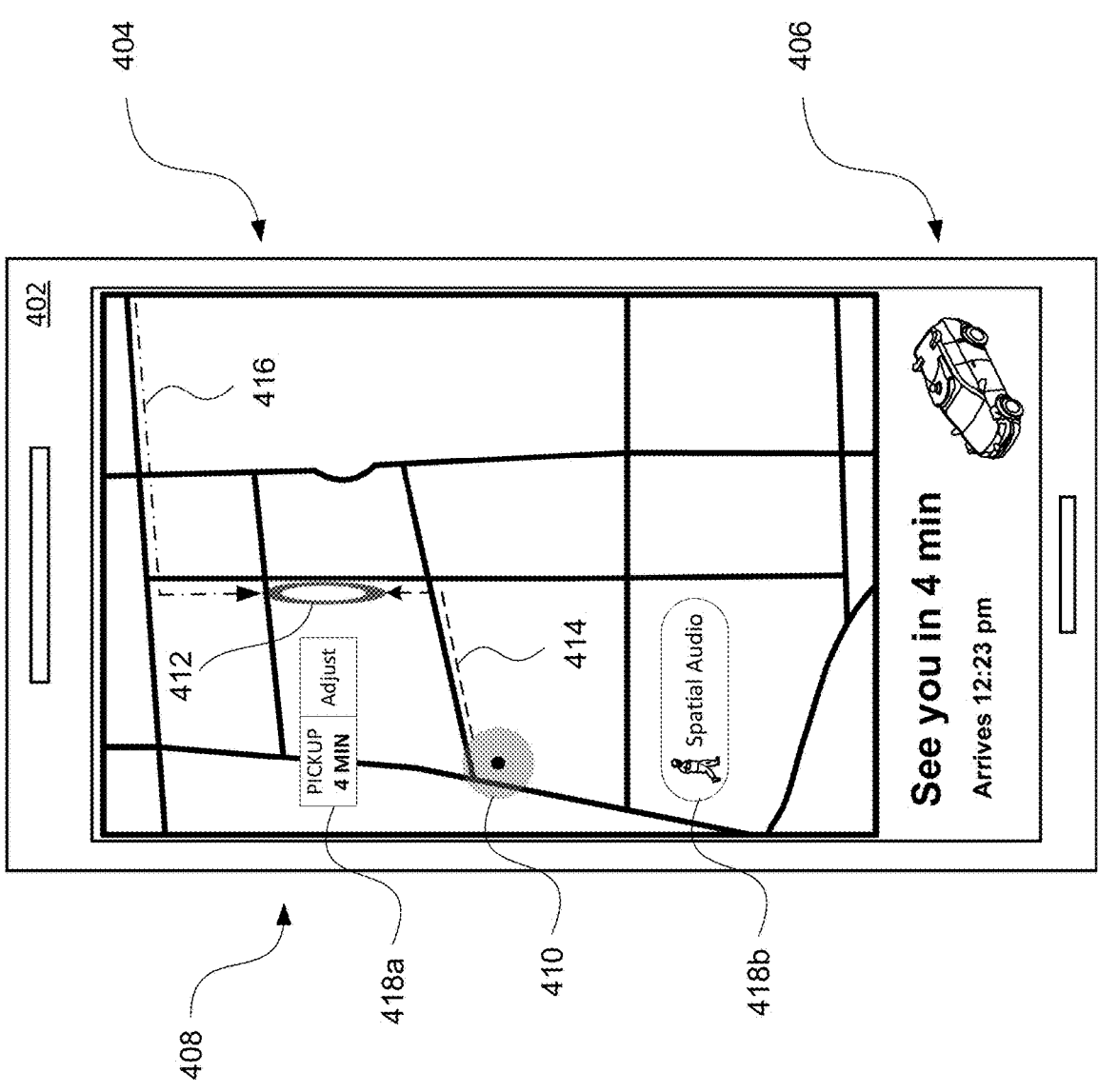
FIG. 4 illustrate an example pickup scenario in accordance with aspects of the technology.

For instance, according to a pickup situation in which the rider's client device is provided with turn-by-turn directions to the pickup location, spatial audio can also be concurrently provided via the user's earbuds or other headphones to indicate where to meet the vehicle for pickup. A map view may be displayable on a client device app, which may run on the rider's mobile phone, wearable (e.g., a smart watch or smart glasses), tablet computer, etc. The app may have a map-focused display. FIG. 4 illustrates an example 400, in which client device 402 includes a displayed user interface (UI) 404 on a display screen of the device. In this figure, one portion 406 of the UI provides basic information about the trip including an estimated arrival time (e.g., "Arrives 12:23 pm") and/or a relative time (e.g., "See you in 4 min"). This portion of the UI may also provide a graphic or other indicia about the vehicle.

In the example 400 of FIG. 4, another portion 408 of the UI presents a map to the user. Here, the map indicates the current location 410 of the rider, the pickup location 412, a walking path 414 for the rider, and a planned route 416 that the vehicle is taking to the pickup location 412. In this example, the Pickup location may encompass multiple parking spaces or a pullover zone where multiple vehicles may go to pick up and drop off passengers. Or the pickup location may be a parking lot where there are dozens or spots or more where the vehicle may park. Alternatively, the pickup location may be at or near an intersection in which there are a number of different places where the vehicle could pull over.

Additional information can be presented in the map portion 408 of the UI. For instance, one or more user-selectable icons 418 may be provided. By way of example, icon 418*a* may indicate to the rider the time until pickup (e.g., "PICKUP 4 MIN") with an option to adjust the location. By selecting the adjust option, the rider may change the pickup location 412 to a closer or more convenient location from their current position. And as shown, icon 418*b* provides a spatial audio option. When clicking the spatial, audio icon 418*b* in the app, the system can generate audio making it seem like the sound emanated from the user's vehicle at its actual physical location, using the earbuds or other headphones to deliver the sound to the user. In this scenario, one benefit is that it would have the same effect as honking the horn, without the downsides of noise pollution, drawing attention to one-self, etc.

In another scenario, the user may be at the pickup location and awaiting the arrival of their vehicle, e.g., for a ride or to receive a package such as groceries or a meal delivery. In this situation, spatial audio can be used to generate a simulated noise to indicate that the vehicle is approaching the user. Spatial audio can also be used to give reminders to the user that their ride is getting closer such as by increasing the volume of the sound, changing the sound, and/or providing other acoustical cues via the user's headphones. The spatial audio sound(s) are able to provide directional context for where the vehicle is relative to the user, or what direction the user should move to head toward the vehicle or pickup/meeting spot. This involves identifying an approximate location of the user, as well as the user's pose, e.g., what direction they are moving or facing.

Figure 5A:
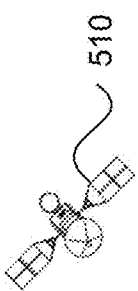
FIGS. 5A-B illustrates an example scenario in accordance with aspects of the technology.
Figure 5A:
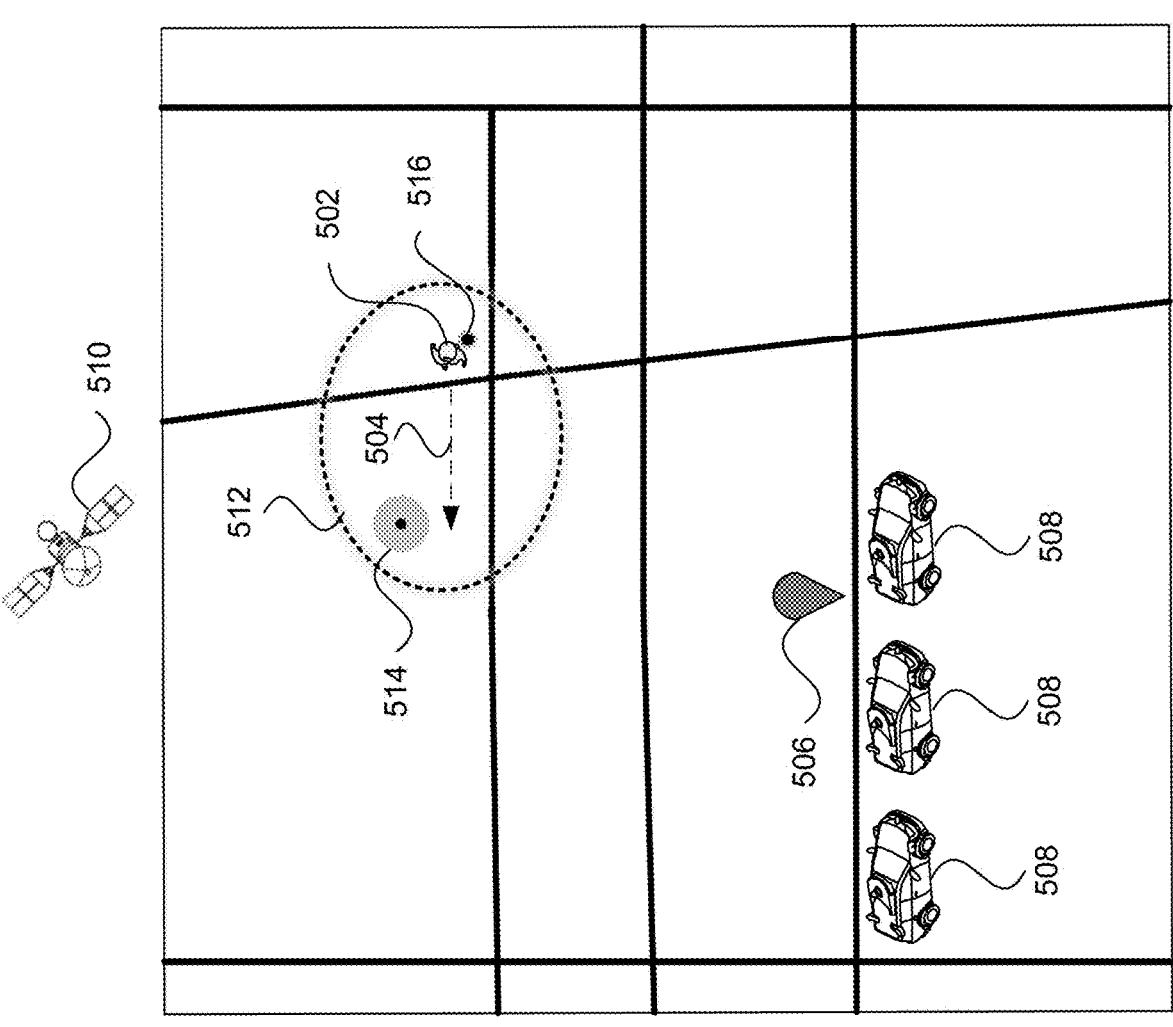
Figure 5A:
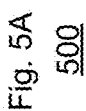

FIG. 5A illustrates an example pickup situation 500. User 502 is shown (via dashed line 504) heading toward a pickup location 506. There may be multiple vehicles 508 waiting at the pickup location for different users. In this example, the user's client device (not shown) is using GPS signals from a set of GPS satellites 510. Based on the satellite information available, the pedestrian's estimated location based on GPS signals may vary from the actual location by tens or hundreds of meters, as indicated by dotted oval uncertainty region 512. Thus, as shown in this example, the client device may estimate the user 502 to be at location 514, which is within the uncertainty region, such as within 3-30 meters of the user's actual position 516.

Figure 5B:
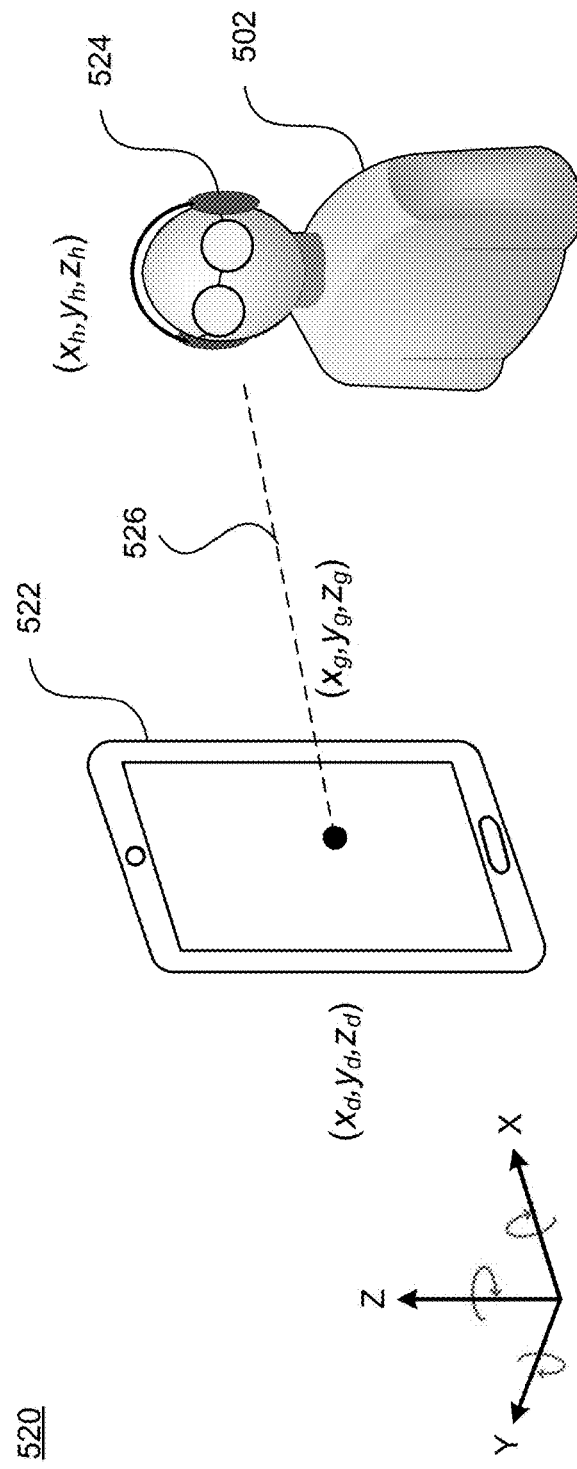
Figure 5B:
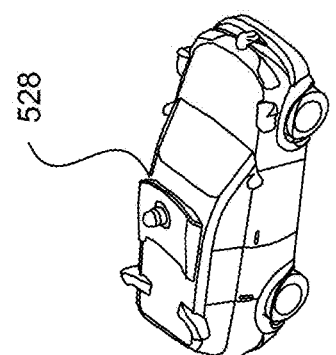

FIG. 5B illustrates an example 520 showing the user 502 and their device 522. As shown, the user 502 may be wearing earbuds or other headphones 524. The device 522 may be held (or wore or carried) by the user and have a device orientation (D=x$_d$, y$_d$, z$_d$). The user's pose may be based on orientation of their head (H=x$_h$, y$_h$, z$_h$). The user

502 may have a gaze orientation 526 (G=x$_g$, y$_g$, z$_g$) based on what they are looking at, which may be the screen of their device to view a displayed map or other data, or which may be their surrounding environment as they look for their vehicle 528. The gaze orientation may be detected in different ways, such as based on sensor data from the user's device (e.g., imagery from a mobile phone or data from a head-mounted display, which may be implemented as part of an augmented reality view) and/or from perception data obtained by the vehicle. The vehicle's location (or the actual pickup location) ma be known via global positioning information and/or other localization information. In this example, the positioning of the user 502 and device 522 are shown in x,y,z coordinates; however, other coordinate systems may be employed (e.g., azimuth and elevation, etc.).

Figure 6A:
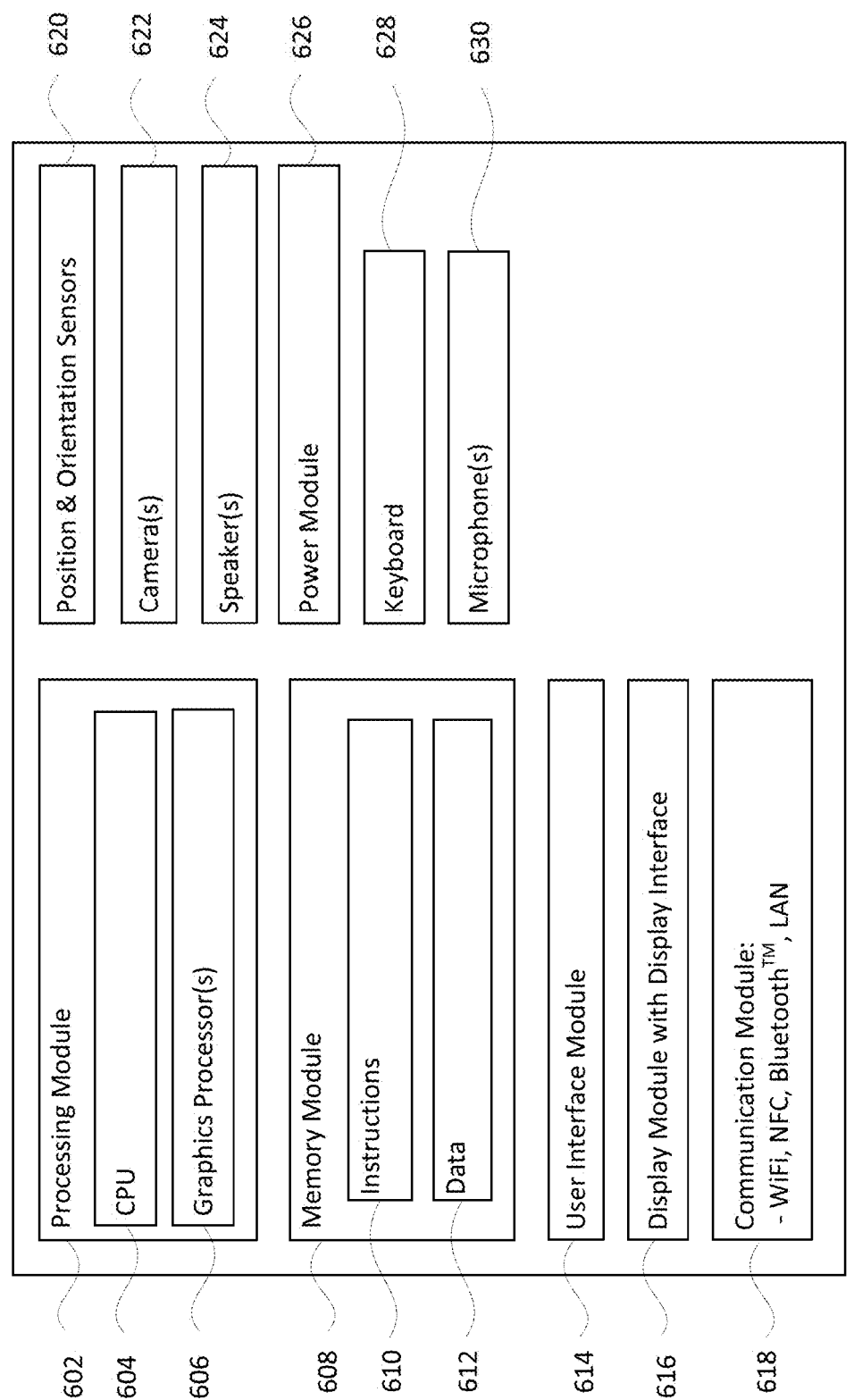
FIGS. 6A-B illustrate example user devices for use with aspects of the technology.

FIG. 6A illustrates a block diagram of an example user computing device 600, such as a mobile phone (or smartwatch, head-mounted display or other wearable). As shown, the client computing device 600 includes a processing module 602 having one or more computer processors such as a central processing unit 604 and/or graphics processors 606, as well as memory module 608 configured to store instructions 610 and data 612. The processors may or may not operate in parallel, and may include graphics processing units (GPUs) ASICs, controllers, and other types of hardware-based circuitry. The processors are configured to receive information from a user through user interface module 614 and information from remote devices (such as vehicles or a back-end vehicle service system) via communication module 618, and to present information to the user on one or more display devices of the display module 618 having a display interface.

User interface module 614 may receive commands or other input information from a user via user inputs and convert them for submission to a given processor. The user interface module may link to a web browser and/or other applications executed by the computing device's processing module 602. The user inputs may include one or more of a touchscreen, keyboard or keypad, trackpad, stylus, microphone, or other types of input devices (e.g., a gesture-based input). The display module 616 may comprise appropriate circuitry for driving the display device to present graphical and other information to the user, such as at a particular resolution and refresh rate. By way of example, the graphical information may be generated by the graphics processor(s) 606, while CPU 604 manages overall operation of the device 600. The graphical information may display responses to user queries or other content on the display module 616. For instance, the processing module may run an autonomous vehicle ride app. a map application, browser application messaging application, gaming application, and/or other service using instructions and data stored in memory module 608, and present information associated with the corresponding application or other service to the user via the display module 616. The memory module may include a database or other storage for application-related information, etc.

Memory module 608 can be implemented as one or more of a computer-readable medium or media, a volatile memory unit or units, or a non-volatile memory unit or units. The memory module 608 may include, for example, flash memory and/or NVRAM, and may be embodied as a memory card or other storage medium. Alternatively or additionally, the memory module 608 may also include removable media. One or more regions of the memory module 608 may be write-capable while other regions may comprise read-only (or otherwise write-protected) memories. The data 612 may be retrieved, stored, or modified by the processors in accordance with the instructions 610. For instance, the data may be stored in computing device registers, in a relational database as a table having a plurality of different fields and records, XML documents or flat files. The data may also be formatted in any computing device-readable format. The instructions 610 may be any set of instructions to be executed directly (such as machine code) or, indirectly (such as scripts) by the processor(s), as discussed above with regard to instructions 608.

As also shown in FIG. 6A, the client device 600 includes the communication module 618 for communicating with other devices and systems, including other client devices such a Bluetooth™-connected earbuds or other headphones, remote servers and databases, etc. The communication, module 618 includes a wireless transceiver: however, the module may alternatively or additionally include a wired transceiver. The user device 600 may communicate with other devices via the communication module 618 using various configurations and protocols, including short range communication protocols such as near-field communication (NFC). Bluetooth™, Bluetooth™ Low Energy (BLE) car other ad-hoc networks, the Internet, intranets, virtual private networks, wide area networks, local networks, private networks using communication protocols proprietary to one or more companies, Ethernet, WiFi and HTTP, and combinations of the foregoing.

The example user device 600 as shown also includes one or more location and/or orientation sensors 620. The location and orientation sensors 620 are configured to determine the location and orientation (pose) of one or more parts of the client computing, device 600. For example, these components may include a GPS receiver or other global positioning component to determine the device's latitude, longitude and/or altitude as well as an accelerometer, gyroscope or another direction/speed detection device such as an inertial measurement unit (IMU). The global positioning component can be used to identify or estimate the location of the device 600, while the orientation sensor(s) can identify the pose of the device as it is held, worn or carried by the user.

The device 600 may also include one or more cameras 622 for capturing still images and recording video streams. In one scenario, the camera(s) 622 may be used to determine the gaze direction of the user, for instance with a front-facing camera when they are looking at the display screen or looking in their surrounding environment. Alternatively or additionally, the camera(s) may be used to take imagery of objects in the user's environment (e.g., via a rear-facing camera). The device location, gaze direction and pose information may be used, via a coordinate transformation, to determine or estimate the user's actual position and direction they are heading, facing or looking. This information may be used when generating spatial audio to be played via the user's earbuds or other headphones that are connected (e.g., wirelessly via a Bluetooth™ connection) to the device 600. The device 600 may also include speaker(s) 624, although when the user is wearing headphones the device may not play audio through the speaker(s). Power module 626 provides power to the various system components. In addition, user inputs include a keyboard 628 and a microphone 630, which may comprise a microphone array having one or more transducers or other microphone elements distributed at various points along the housing of the computing device.

In one scenario, the device 600 may determine the relative pose of the user or the direction they are facing from imagery or other sensor data from the device 600. This may be helpful in situations where the headphones do not have sensors that can detect a heading of the user. Here, for example, a front-facing camera can take one or more images of the user to identify how they are facing and/or their gaze direction. How the user is holding or wearing the device 600 may also be used to identify the pose. This information may be applied, along with the device's location and orientation information, to determine the direction the user is facing. Alternatively or additionally, scene information about objects in the user's environment may be captured by a rear facing camera and/or the front facing camera of the device. This scene information may be used to identify or refine the device's location and orientation, for instance by comparison of the captured objects against a database of imagery around that location. By way of example, this can be done via a visual positioning system. Thus, in one situation the system may calibrate directional information using imagery from the user's device or other data.

Figure 6B:
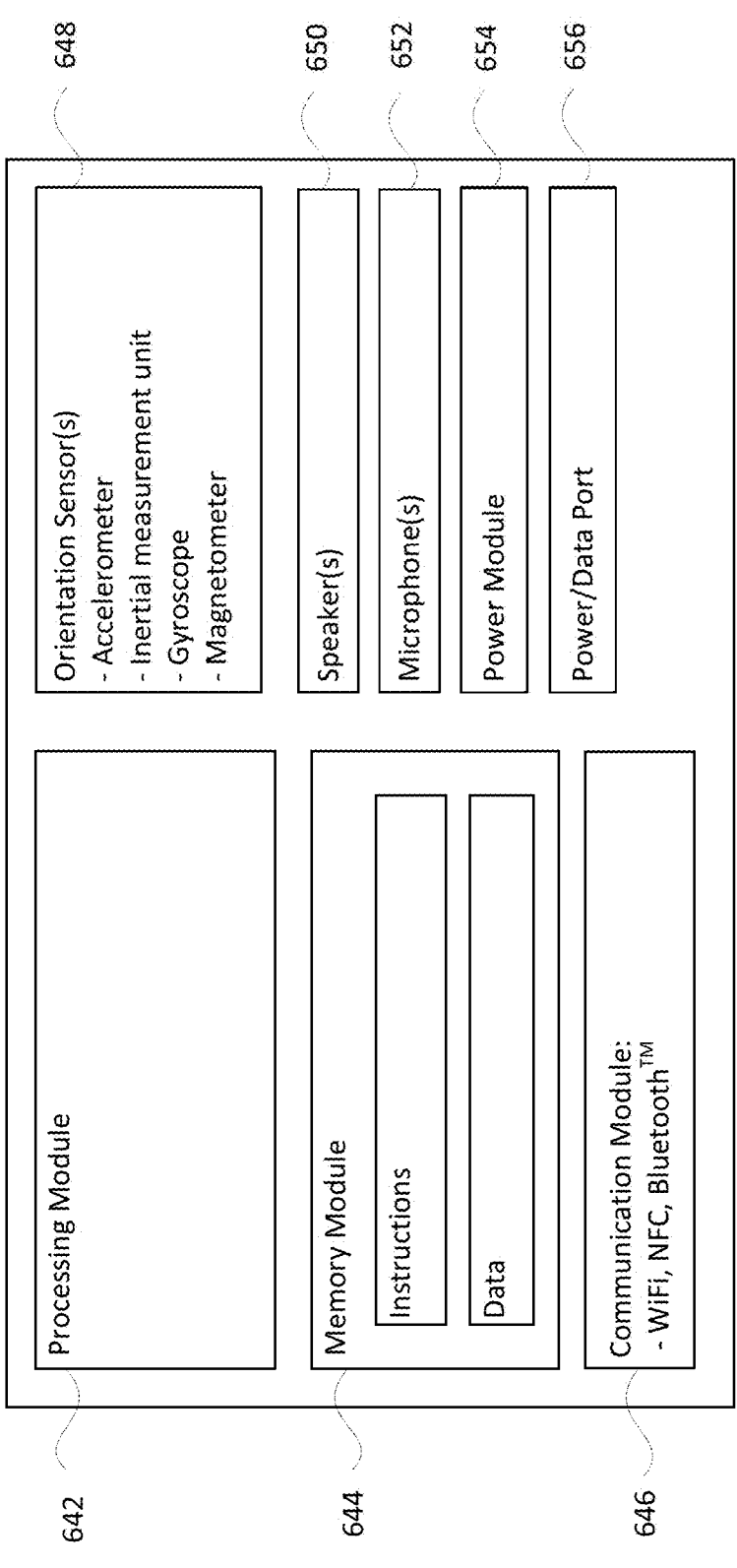

FIG. 6B illustrates a block diagram of an example headphone device 640, which may be a pair of earbuds, a headset or other wearable headphones. As shown, a processing module 642 is provided, which can include having one or more computer processors, as well as memory module 644 configured to store instructions and data similar to the devices described above. The headphone device 640 includes communication module 646 for communicating with other devices, such as a portable user device which may be the user's mobile phone, a tablet PC, a wearable computing device or the like. The communication module 646 includes a wireless transceiver, although the module may alternatively or additionally include a wired transceiver. The headphone device 640 may communicate with such other user devices via the communication module 646 using various configurations and protocols, including short range communication protocols such as near-field communication (NEC), Bluetooth™, Bluetooth™ Low Energy (BLE) or other ad-hoc networks in the manner described above.

The example headphone device 630 as shown also includes one or more orientation sensors 648 configured to determine the orientation (pose) of the device 640 when worn by the user. For example, these components may include one or more of an accelerometer, gyroscope, magnetometer or other device such as an inertial measurement unit (IMU). These sensors collect orientation data at different points in time (e.g., every 100 ms or more or less). Changes in orientation data can be associated with head movement (e.g., looking in a different direction) and/or movement of the user (e.g., change in direction the user is walking). This dynamic head tracking enables generation of directional audio information for presentation to the user in real time, which can help the user quickly find their vehicle.

The device 640 includes speaker(s) 650, which are configured to generate spatial audio or other sounds in response to illumination provided by another user device such as device 600 of FIG. 6A. One or more microphones 652 may also be provided. The microphone(s) 652 may be configured as a microphone array having one or more transducers or other microphone elements distributed at various points along a housing of the headphone device 640. Power module 654 provides power to the various system components. A port, such as a power and/or data port 656, may also be provided, for instance to charge the power module 654 of the headphone device, receive data updates, etc. The device 640 may include two headphone pieces or two earbuds that are physically connected together. In this case, certain components such as microphone 652, power module 654 and port 656 may be shared. However, in an alternative configuration two earpieces may be physically separate from one another. Here, certain components may be provided in each earpiece, although microphone 652 may only be included at one of the earpieces. The technology herein makes no distinction between left and right earpieces.

Different types of headphones may have different onboard components, which may impact their functionality. For instance, one type of headphone may not have any onboard sensors, and thus would be able to provide spatial audio cues gathered from sensors of other devices (such as the user's mobile phone, smartwatch or head-mounted display). Another type of headphone may incorporate a gyroscopic sensor. In this case, the headphone may be able to provide spatial audio cues, and feed the spatial audio system data about the user's heading, based on the gyroscopic sensor information. Here, a calibration process to set a baseline for the gyroscope may be employed prior to enabling spatial audio. A further type of headphone may have a magnetometer or both a magnetometer and a gyroscope. This arrangement is configured to provide spatial audio cues, and to feed the spatial audio system data about the user's heading using the magnetometer. In this case, if other sensors are present (e.g., an IMU), they can augment the user's heading with pose in the x-dimension.

In one scenario, in the absence of knowing the user's pose relative to a reference frame, the system may operate as follows. If a gyroscope is present in the headset, the processing system can capture a reference frame and use sensor data from the gyroscope to apply a movement differential against the reference frame. Assuming the gyroscope data is given in a rotation rate per given interval, the processing system can derive the rotational pose from a starting position. This reference frame would then be adjusted by a given offset that can be determined through calibration, in order to align the frame against the system's understanding of true North. If a magnetometer is present in the headset, determining spatial direction can be done by determining the difference between the user's current heading and the vehicle's heading. The user's current heading comes from the magnetometer's sensor data, and the vehicle's heading is obtained (directly or indirectly) from the vehicle. This difference in headings is then used to determine the positioning of the spatial audio object in the scene, as the location (and heading) of the vehicle and user are identified relative to one another.

The connection between the headphones and the user's device should have low latency. For instance, dining operation, orientation data from the headphones may be sent to the user's device (e.g., mobile phone or smartwatch) on the order of every 250 ms or less.

The user's device may generate a 3D scene based on the location of the user and/or the location of the vehicle or pickup location. The 3D scene may incorporate details from roadgraph or other detailed map information as discussed above. Alternatively or additionally, the 3D scene may be created or updated to include objects in the environment based on real-time sensor data or related sensor information received from the vehicle. Whichever sound is to be played (e.g., a horn honk sound, engine idle sound, user preference sound, etc.) is associated with an object or virtual node in the 3D scene. This association has a directional component (e.g., a sound vector $S=s_x, s_y, s_z$), and may also include a loudness component to indicate relative closeness between the user and the virtual sound source (e.g., a loudness L on a scale of 1-100, with 100 being the loudest to indicate the user is adjacent to the vehicle).

Figure 6C:
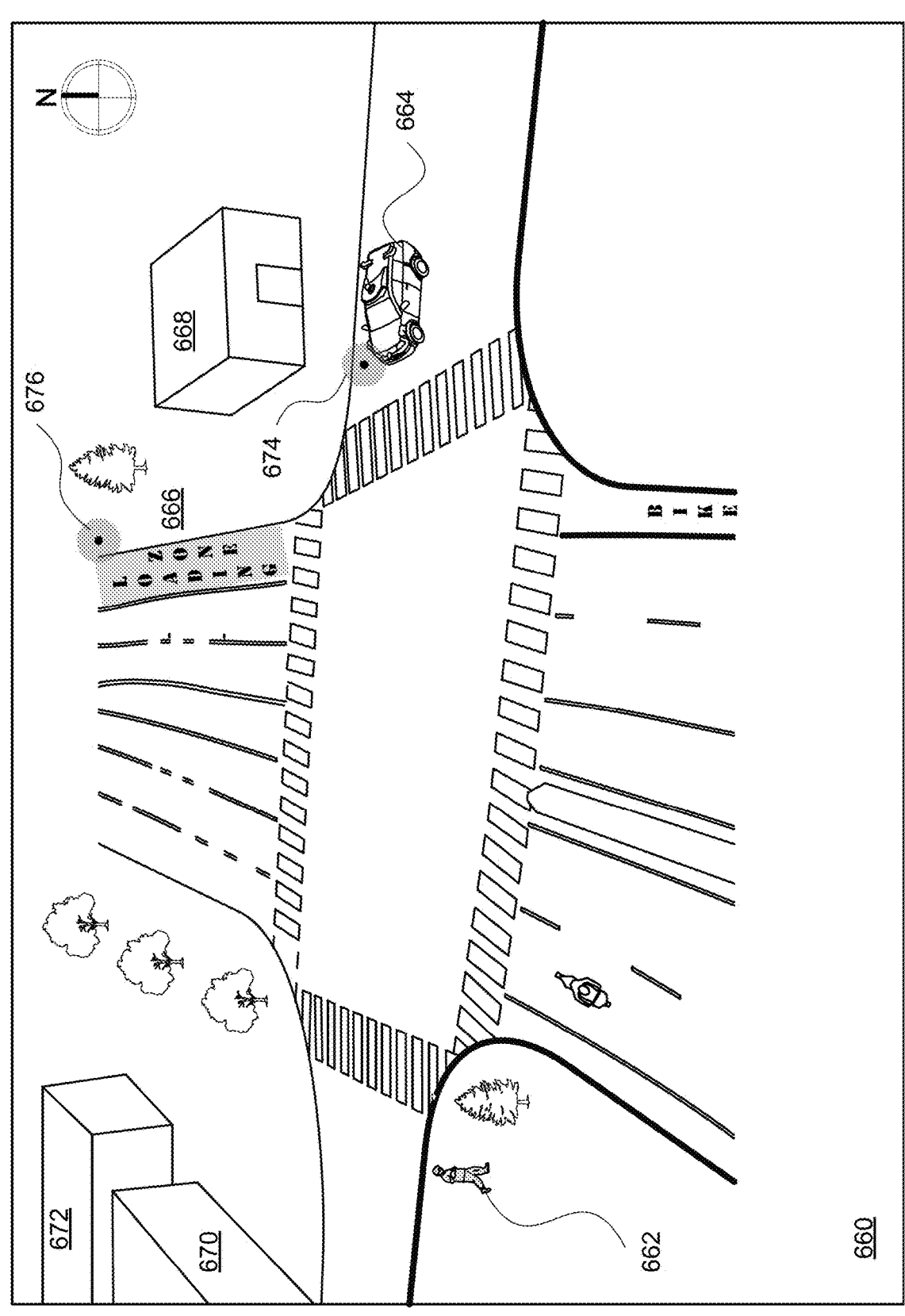
FIG. 6C illustrates a virtual 3D scene for spatial audio in accordance with aspects of the technology.

FIG. 6C illustrates an example 660 of a 3D scene, which includes the (estimated) location of the user 662, the location of the vehicle 664, and a pickup location 666. The 3D scene also includes objects that may affect the acoustics of the scene, such as buildings 668, 670 and 672. In one example, a virtual sound source 674 is positioned at or adjacent to the current location of the vehicle 664. In another example, a virtual sound source 676 is positioned at or adjacent to the pickup location 666. The directionality of the sound vector S for the virtual sound source is derived from a comparison of the user's estimated location, the location of the vehicle (or pickup location), and the pose off the user. The loudness L may be based on the distance between the user and the vehicle (or the pickup location). Environmental factors, such as ambient noise in the user's immediate environment, may be factored in when the device selects the loudness value. For instance, if there is no ambient noise and the user is 100 meters from the vehicle, loudness L may be selected to be 25 (out of 100). However, if there is significant ambient noise due multiple vehicles honking horns, music playing from a nearby store, etc., then the loudness L may be selected to be 45 (our of 100).

Figure 7A:
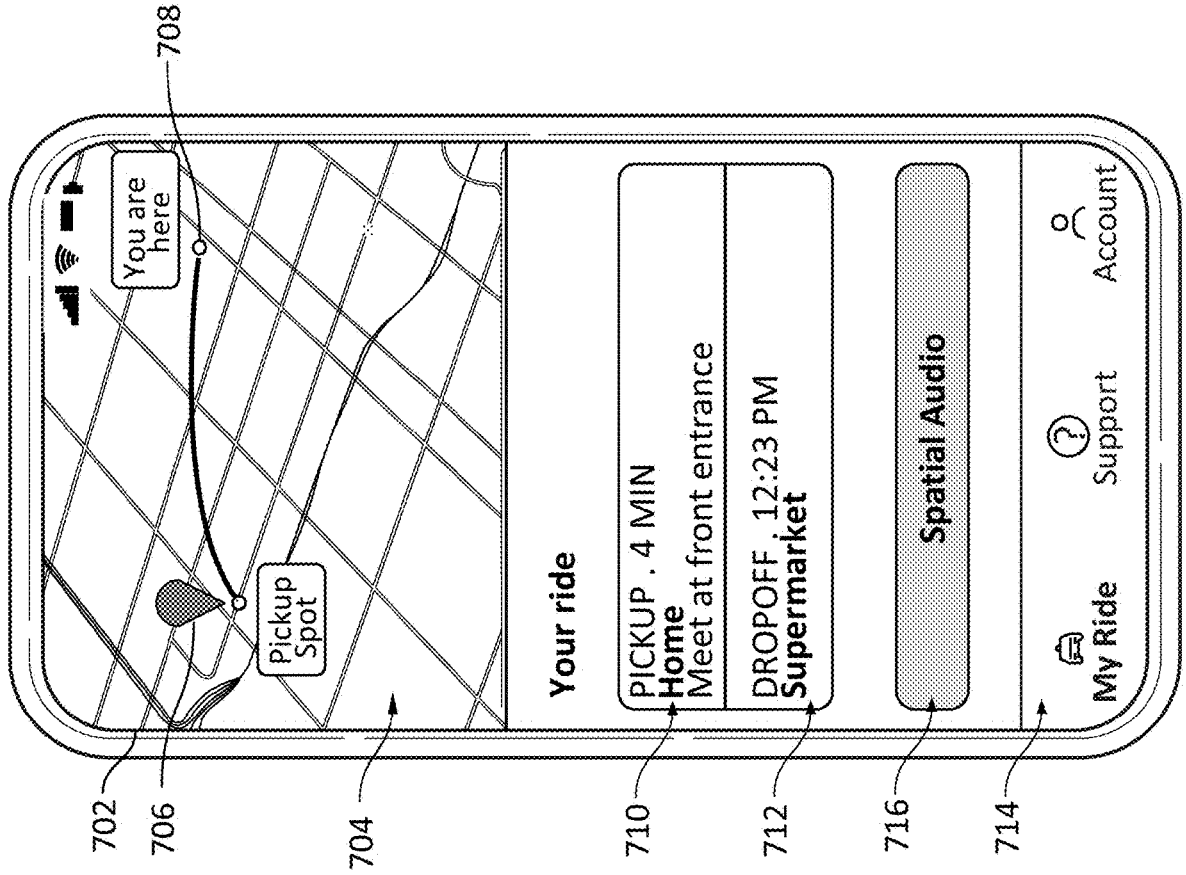
FIGS. 7A-B illustrates spatial audio examples in accordance with aspects of the technology.

The user's device may be running an app regarding a pickup or delivery. As noted above, this may include generating a map on the device to show the current location of the vehicle associated with the pickup or delivery and/or the selected location for the pickup or delivery. FIG. 7A gives an example 700 showing GUI 702 with map 704. As shown in this example, the map 704 identifies a location 706 as a pickup spot where the user will meet the vehicle (which may include text indicating "Pickup Spot"), and a current location 708 of the user (which may include an icon indicating "You are here"). The GUI 702 may also include an information section with details about the ride, including pickup location details 710, tide information 712 such as the drop-off location, and a section 714 where the user can toggle between ride info (e.g., "My Ride"), rider support (e.g., "Support"), and account details (e.g., "Account").

By pressing the button 716 for spatial audio, the user can have their device generate spatial audio information and send that information to their headphones. Alternatively, the app may allow the user to select spatial audio as a default option to use whenever the user is wearing their headphones and they are paired with their mobile phone or other device. Upon enablement of the spatial audio feature, the user device can take obtained location information about the vehicle (or pickup/meeting location), the estimated location of the device (e.g., from GPS or other location data obtained by the device), and the pose of the user based on the orientation information received from the headphones, and generate one or more spatial audio sounds.

The sound(s), when played through the speakers of the headphones, provide contextual cues about the user's relative distance from the vehicle (or pickup/meeting location). This can include a directional component based on where the user is actually facing (or their eye gaze orientation) at that point in time. The sound(s) can include a horn honk or other vehicle noise that sounds to the user as though it is emanating from the vehicle's current location (or the location of the pickup/meeting spot). Other sounds, including user-selectable sounds, may be played to give the spatial effect.

In one scenario, the volume of the sound may be correlated with the distance to the vehicle. Thus, as the user gets closer to the vehicle, the sound may increase to provide the sense that the vehicle is closer. This increase may be a linear increase, a nonlinear change that is inversely proportional to the squared distance, or some other increase.

The directionality of the spatial audio sound may vary between the two earbuds or other headphones (assuming a pair of headphones is worn). This can be used to guide the user to move in a particular direction, such as to make a left or a right at an intersection, or to head in a particular direction (e.g., northwest or southeast). In one example, the headphones could play the volume at a low setting until the user turn in the correct direction, at which time the volume increases. Alternatively, the sound may change to a different sound to indicate that the user is moving in the right direction. In some instances, the sound may, be changed if the user is not moving in the right direction. This may include playing a sound selected to be distinct from ambient noise in the user's nearby environment (e.g., having one or more different frequencies from people talking, idling trucks, sirens, etc.).

In one example, the spatial audio sounds are generated using an API on the user's device. The majority of work when generating spatial audio is within the audio engine within the scene. By way of example, once the audio engine creates suitable audio information, it will output the audio information in a stereo format. This stereo audio encapsulates the spatial aspect of the audio, thus the headphones themselves do not have any particular requirements other than being capable of playing, stereo audio. The audio files used by the audio engine can include synthesized or real-world sounds. The system may store a set of default audio files that may be retrieved by the audio engine. Each audio file may correspond to a tone, melody or other sound, which may be selected by the system based on a set of criteria having one or more factors. The factors may include, by way of example, user preference, ambient noise in the user's environment (e.g., so that a sound may be presented to the user that is distinct from the ambient noise), object types (e.g., so that sounds may be presented to correspond to or differentiate from specific objects in the user's environment), etc. In one example, when the user is waiting for the vehicle or heading toward the vehicle (or toward the pickup location), the sound may be selected to differentiate from ambient street noise or to differentiate from the noises made by objects in the vicinity (e.g., to differentiate from horn honks from cars or trucks). In another example, when the user is in the vehicle and preparing to exit, the sound may be selected to correspond to a particular object to give an indication of the type of object. Here, if a bicyclist is approach on the left side of the vehicle, the sound may be that of a bicycle bell, to let the user know that a bicyclist is coming up on the left and so they should exit on, the right.

Figure 7B:
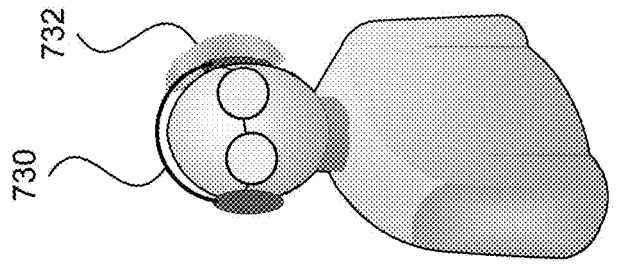
Figure 7B:
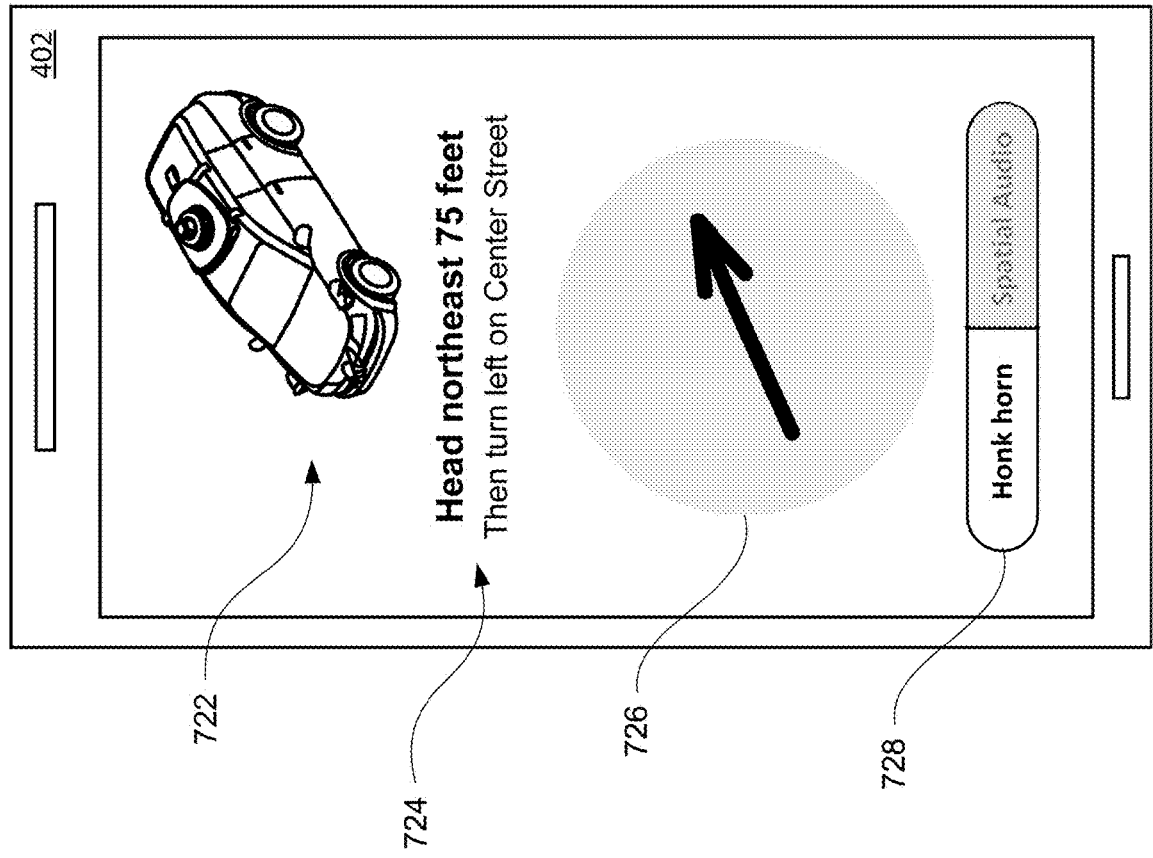

The spatial audio information may be used to supplement visual directions presented on the GUI of the user's device. FIG. 7B illustrates an example 720 in which the displayed GUI presents an image of the vehicle 722 along with text information 724 for the direction to head, and a compass or arrow 726 to visually show the user which direction to go. Here, by pressing one of the buttons 728 (e.g., "Spatial Audio"), a direction sound is played in the headphones 730 of the user, as shown by shaded area 732. In this way, the spatial acoustic information at the headphones cam reinforce or otherwise supplement the visual (and/or haptic) information presented on the user device. For instance, the spatial acoustic information may be coordinated to play in conjunction with presenting turn-by-min directions or other trip-related information to the user.

Figure 8A:
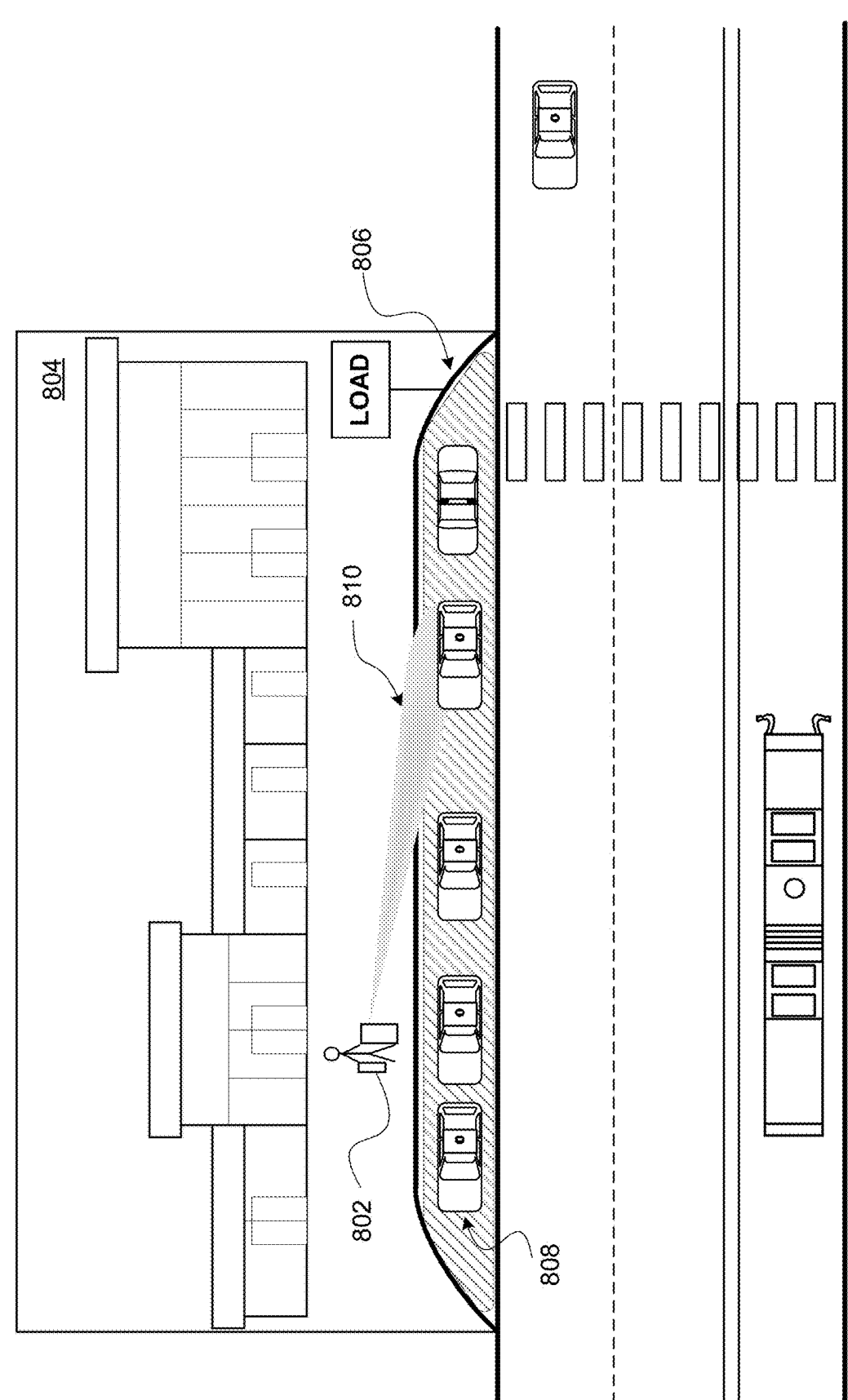
FIGS. 8A-D illustrate spatial audio examples relating to pickups or deliveries in accordance with aspects of the technology.

FIG. 8A illustrates an example scenario 800 where a user 802 is exiting a building, such as a mall, hotel, airport, train station or bus depot 804. As shown, there is a loading zone 806 in which a number of vehicles 808 are pulled over. In instances where there is a fleet of vehicles dispatched to pick up riders, having a number of vehicles of the same or similar type pulled over can be confusing to the riders. It may not be easy to discern the correct vehicle's license plate or other visual indicia. And if multiple riders issue requests for their vehicles to honk the horn or flash their lights, it would be difficult to associate the correct vehicle with each rider (in addition to creating unnecessary noise and visual pollution). Instead, by generating spatial audio information in real time based on the vehicle's known location (received from the vehicle or a back-end fleet management service), the rider's approximate location (obtained by the rider's device such as their mobile phone), and the direction they are facing or looking (received from their headphones), the rider's device can transmit the spatial audio information to the headphones to be played. As shown by shaded area 810, this acoustical information can include both a directional component and an intensity (loudness) component, to audibly indicate to the rider which vehicle is picking them up. This is done without other people hearing the information, which reduces noise pollution and avoids confusion about which vehicle is for which rider.

In one alternative, the vehicle may concurrently communicate through non-acoustic sensory mediums in conjunction with the spatial audio. For instance, a light might flash from a dome or other part of a roof pod sensor assembly of the vehicle while an associated spatial audio sound plays for the user. This multi-modal experience may produce more visceral results. In this situation, the system may sync up the other sensory information with the spatial audio. In another alternative, which may work in con unction with the vehicle sensory information, the spatial audio presented to the user may be associated with specific locations or other waypoints presented to the user on their client device. For instance, when the turn-by-turn directions being presented on the client device indicate to make a particular turn (e.g., make a left at the intersection), a complementary spatial audio sound may be presented concurrently with the information presented on the client device. In any of the above situations, the user's client device may coordinate the playing of the spatial audio concurrently with the vehicle information and/or client device information.

Figure 8B:
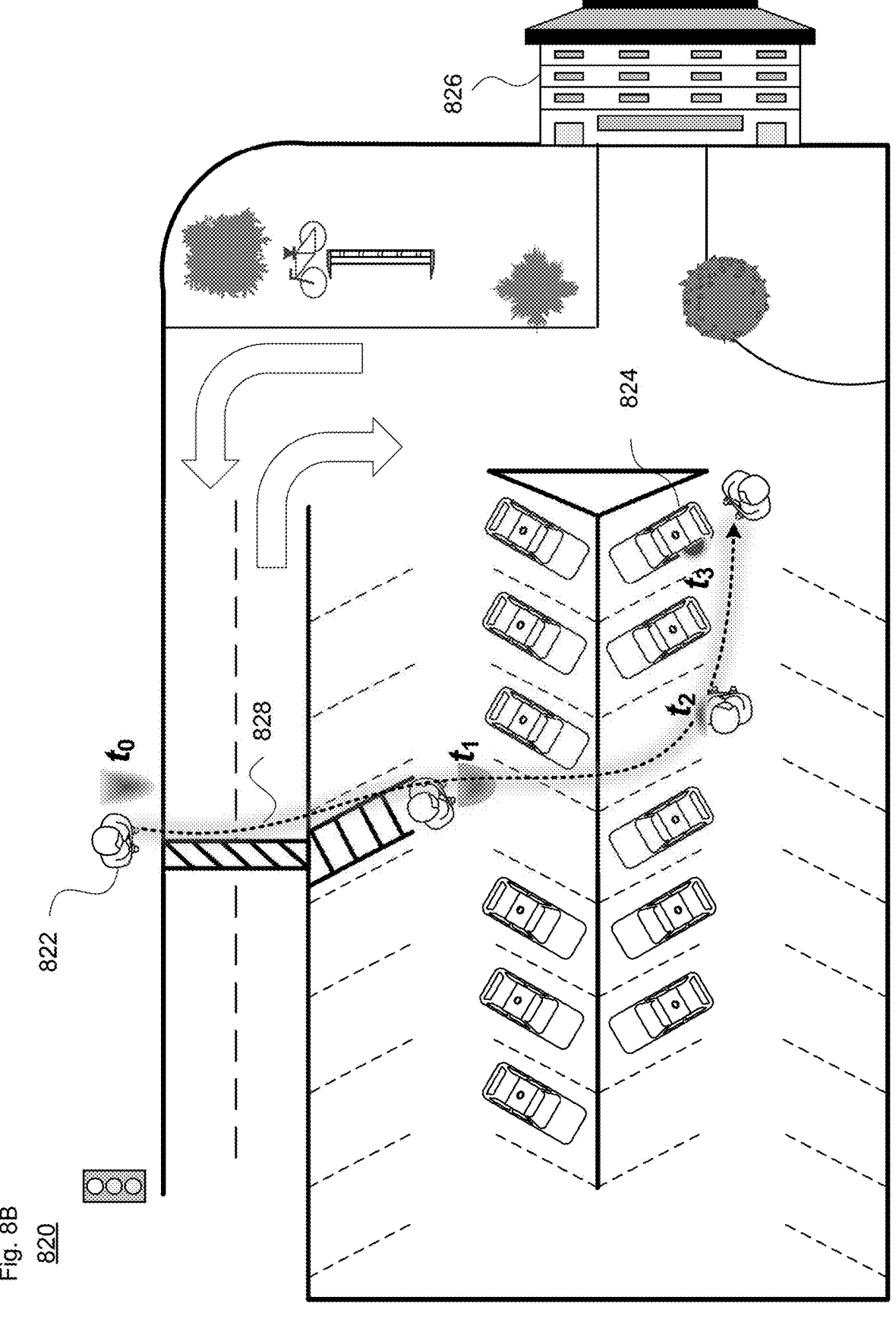
Figure 8C:
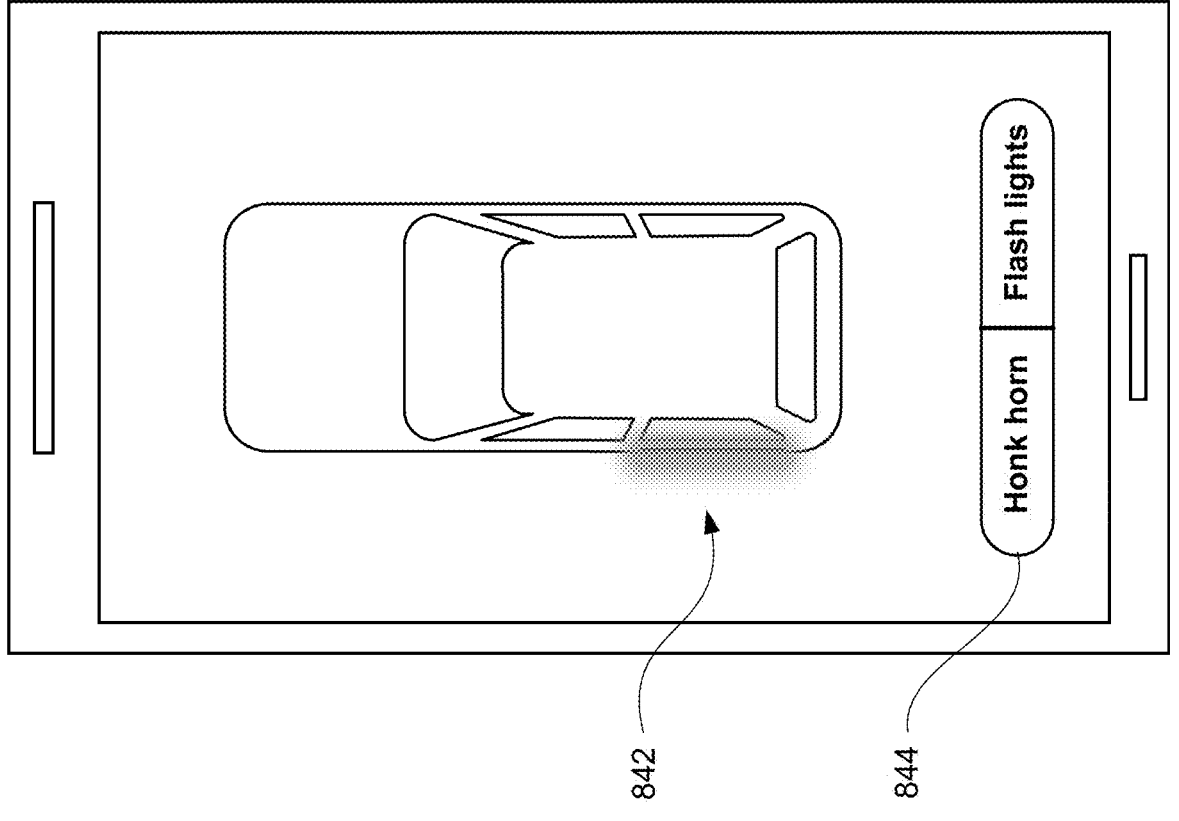
Figure 8D:
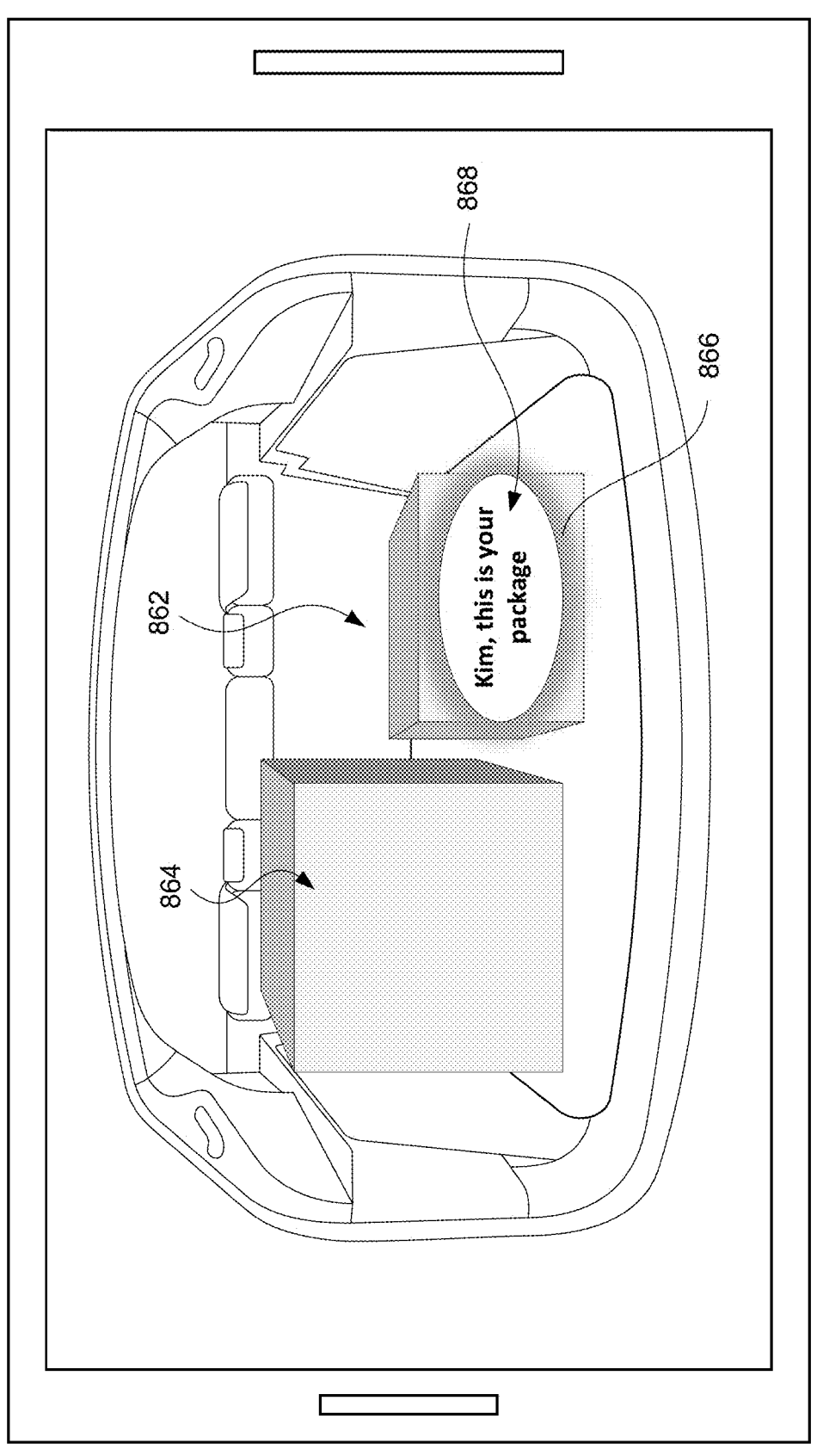

FIG. 8B illustrates another scenario 820, where a person 822 has a pickup scheduled with vehicle 824. Here, the vehicle 824 is located in a parking lot adjacent to a store or office building 826. In this example, different or updated spatial audio information is presented to the person at various times $t_0$, $t_1$ and $t_2$ to indicate to the user which direction to head, with the shaded areas adjacent to the times indicating directionality (and optionally loudness to indicate distance). Dotted arrow 828 indicated the guided path taken by the person according to these audible cues. At time $t_3$, as shown by the shaded region, a spatial audio signal is generated to indicate to the person which door or side of the vehicle to enter. As shown in view 840 of FIG. 8C, this audible cue can be supplemented (or supplement) visual indicia 842 on the GUI of the person's device. This can be done by pressing audio notification button 844 on the GUI. And FIG. 8D illustrates yet another example 860. Here, the person is receiving a package delivered by the vehicle. As shown, the truck, rear seat or other part of the vehicle contains multiple packages 862 and 864. Here, shaded area 866 represents the spatial audio information to indicate where the person should look to find their package. This may be accompanied by visual indicia 868, e.g., with text stating "Kim, this is your package".

As the person gets closer to the vehicle, the directional accuracy of the spatial audio (and optionally its relative volume to indicate distance) may become more pronounced. Alternatively or, additionally, this can be done in accordance with the relative accuracy of the positioning information. As noted above, one type of headphone may not have any onboard sensors, while a second type may have a gyroscopic sensor, and a third may have a magnetometer or both a magnetometer and a gyroscope. In the first case, the directionality may be fairly general (by way of example only, a directionality on the order of 45° or more), whereas in the second case the directionality may be more focused (by way of example only, a directionality on the order of 20°-40° or more), and in the third case the directionality may have the most focus (by way of example only, a directionality on the order of 5°-15° or more). In other words, the more accurate the sensors of the headphones are (with or without other information, such as sensor information from the user's mobile phone or other personal device, or perception information from the vehicle), the more refined the directionality of the spatial audio may be.

In-Vehicle Functionality

As noted above, spatial audio can be applied to a rider's in-vehicle experience. This may include providing information about the trip or the vehicle itself. This can include supplementing an in-vehicle or client device user interface with timely audio information. This can include an assistant feature where audio is presented to the rider when passing a certain location (such as a particular restaurant or store) or certain landmarks (e.g., "if you look to your left, you can see Rockefeller Center"). This audio can be presented using spatial audio directionality (and, optionally, loudness) as discussed above.

The assistant feature may include a hands-free option as a preference, where the rider can ask questions audibly and, hear responses through their headphones. The assistant feature may be via an app on the rider's device (e.g., mobile phone) or via an in-vehicle user interface (e.g., user interface 212 of FIG. 2). In addition to assistant-related features, spatial audio may be provided to the rider for information about the trip, including trip status, what the vehicle is currently doing (e.g., waiting at a yield sign for a pedestrian to cross the street), what the vehicle's planner has, scheduled for an upcoming driving action (e.g., will be exiting the freeway at the next exit), etc. This spatial audio information may include directional information, such as to give context to what the vehicle is doing or what and where the upcoming driving action is, such as by providing a turn signal sound that appears to be coming from the right side of the rider that gets louder as the vehicle approaches the exit. The spatial audio may also provide helpful information about the vehicle itself. In this case, if the rider is taking a virtual tour of the vehicle, directional sounds may be mapped to the location of different components such as buttons, with the sounds explaining or suggesting what those buttons do. Alternatively or additionally, the sounds may be mapped to features around the vehicle such as different sensors mounted on the sides or roof of the vehicle. In this case, the directional information may indicate where a given sensor is located, and explain how it works.

Figure 9A:
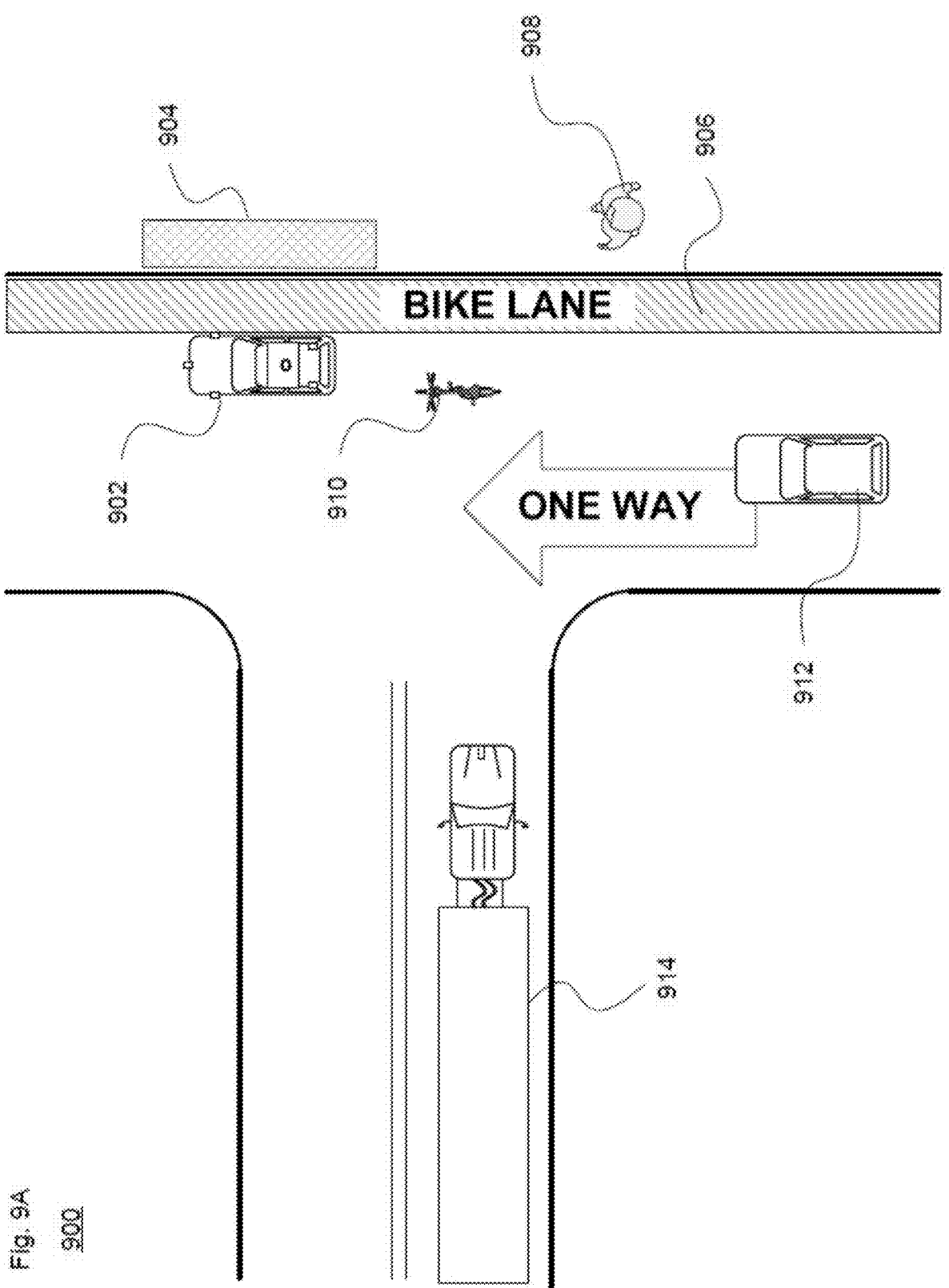
FIGS. 9A-B illustrate in-vehicle spatial audio examples in accordance with aspects of the technology.

In another scenario, spatial audio can be used to provide situational awareness of vehicles, bicyclists or other objects near the vehicle that can impact a rider's departure from the vehicle. For example. FIG. 9A illustrates a view 900 in which vehicle 902 is parked near the curb along a pullover zone 904 in order to drop off one or more riders (not shown). Here, the vehicle may be pulled over adjacent to a bicycle lane 906. In this scene, there is a pedestrian 908 walking along the sidewalk on the right side of and behind the vehicle, a bicyclist 910 pulling around the left rear side of the vehicle, and vehicles 912 and 914 along different parts of the roadway. Perception data from the vehicle's perception system can be used to identify the positions of the pedestrian 908 and bicyclist 910 relative to the vehicle 902, such as in the vehicle's nearby vicinity. For instance, lidar, camera, radar and/or sonar sensors may detect the locations of such objects, and the vehicle's computing system may classify the objects as pedestrians, bicyclists, etc., based on various factors including their size, shape, location, rate of speed and/or other factors.

Figure 9B:
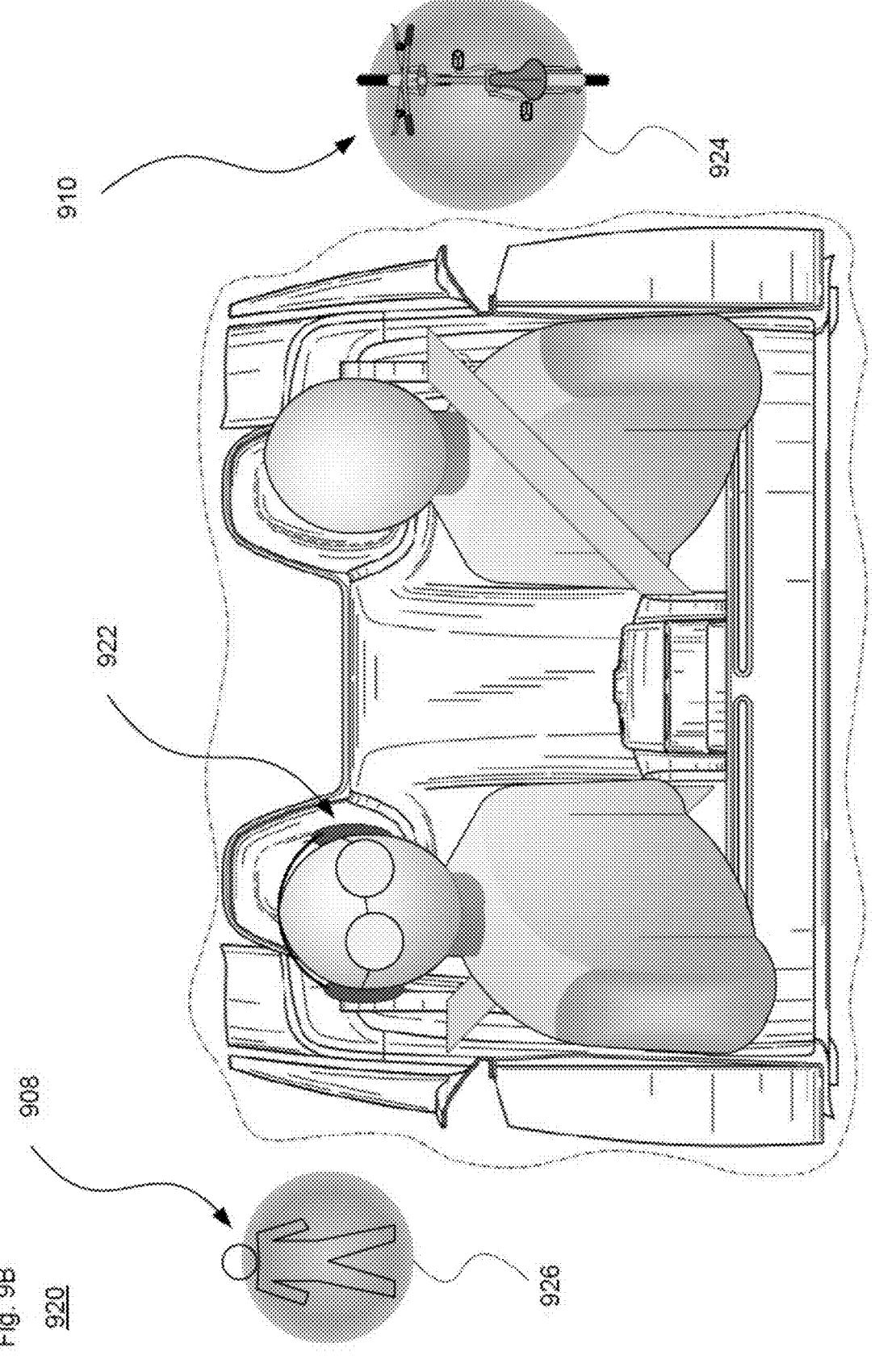

View 920 of FIG. 9B is a virtualized representation of the scene. Here, in response to detecting the pedestrian 908 walking on one side and the bicyclist 910 riding on the other side, the vehicle's computing system may generate spatial audio information that is sent to a rider's headphones 922. This may be done directly via a Bluetooth™ or other wireless link between the vehicle's communication system and the headphones 922. Or using the rider's computing device (e.g., mobile phone or smartwatch) to relay the signal from the vehicle to the headphones 922. In this example, the system may cause different spatial audio signals 924 and 926 to be generated to indicate the presence of the bicyclist 910 and pedestrian, respectively. The spatial audio signals are represented in this figure as shaded circles. Here, because the pedestrian 908 is farther away and is approaching more slowly than the bicyclist 910, that directional sound 926 presented to the rider may be fainter than the directional sound 924 associated with the bicyclist 910. In one example, the spatial audio information may indicate verbally the type of object, where it is approaching from, how fast (or slowly) it is approaching, a warning or other notification, and/or which side or which door the rider should use to exit the vehicle. This scene presentation leverages the real-time sensor information obtained by the vehicle to give cues to tire rider for situational awareness, which can be particularly beneficial when the rider is unable to see behind the vehicle or otherwise may not be cognizant of what is happening outside the vehicle.

Example System Architecture

Figure 10A:
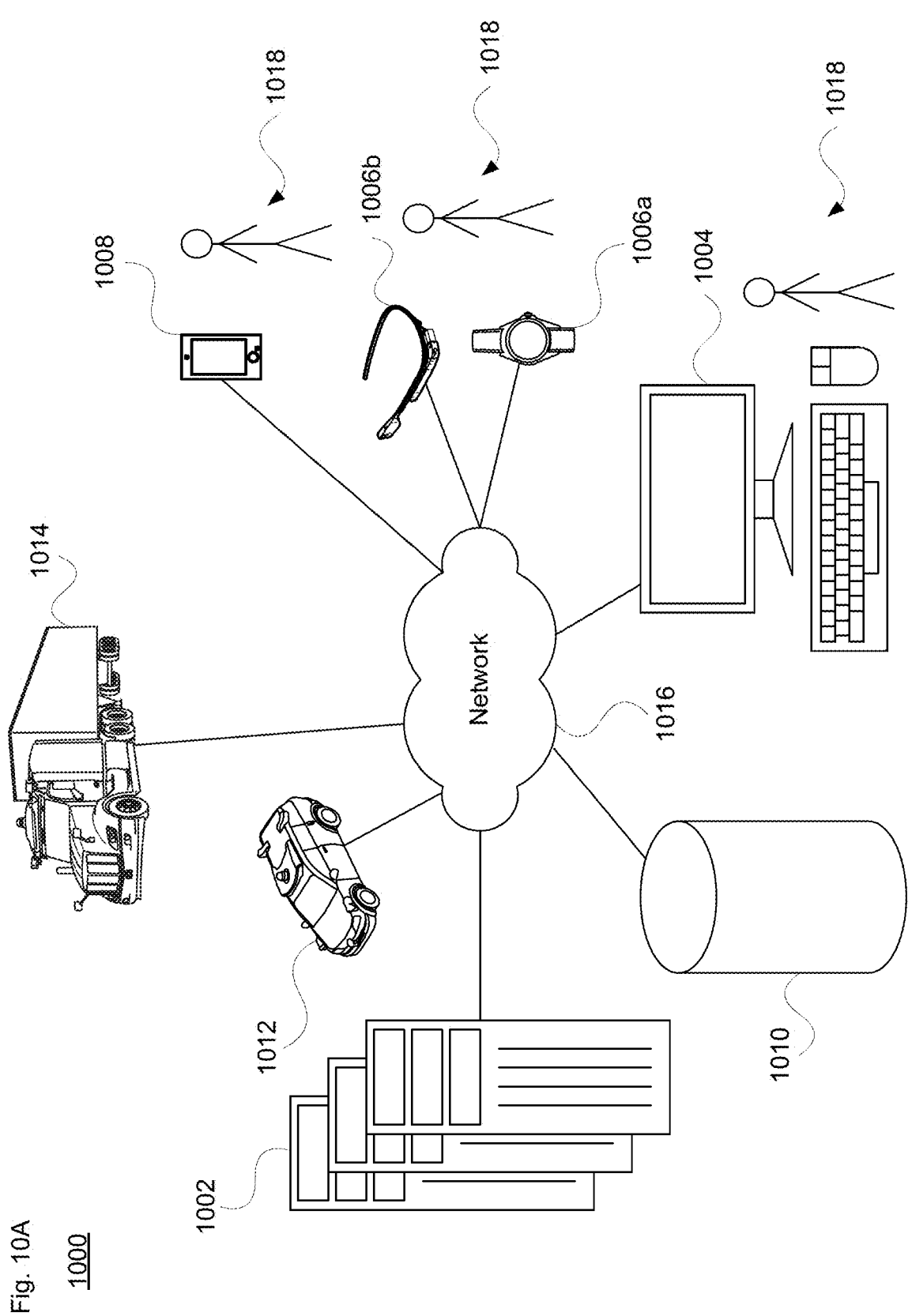
FIGS. 10A-B illustrate an example system in accordance with aspects of the technology.
Figure 10B:
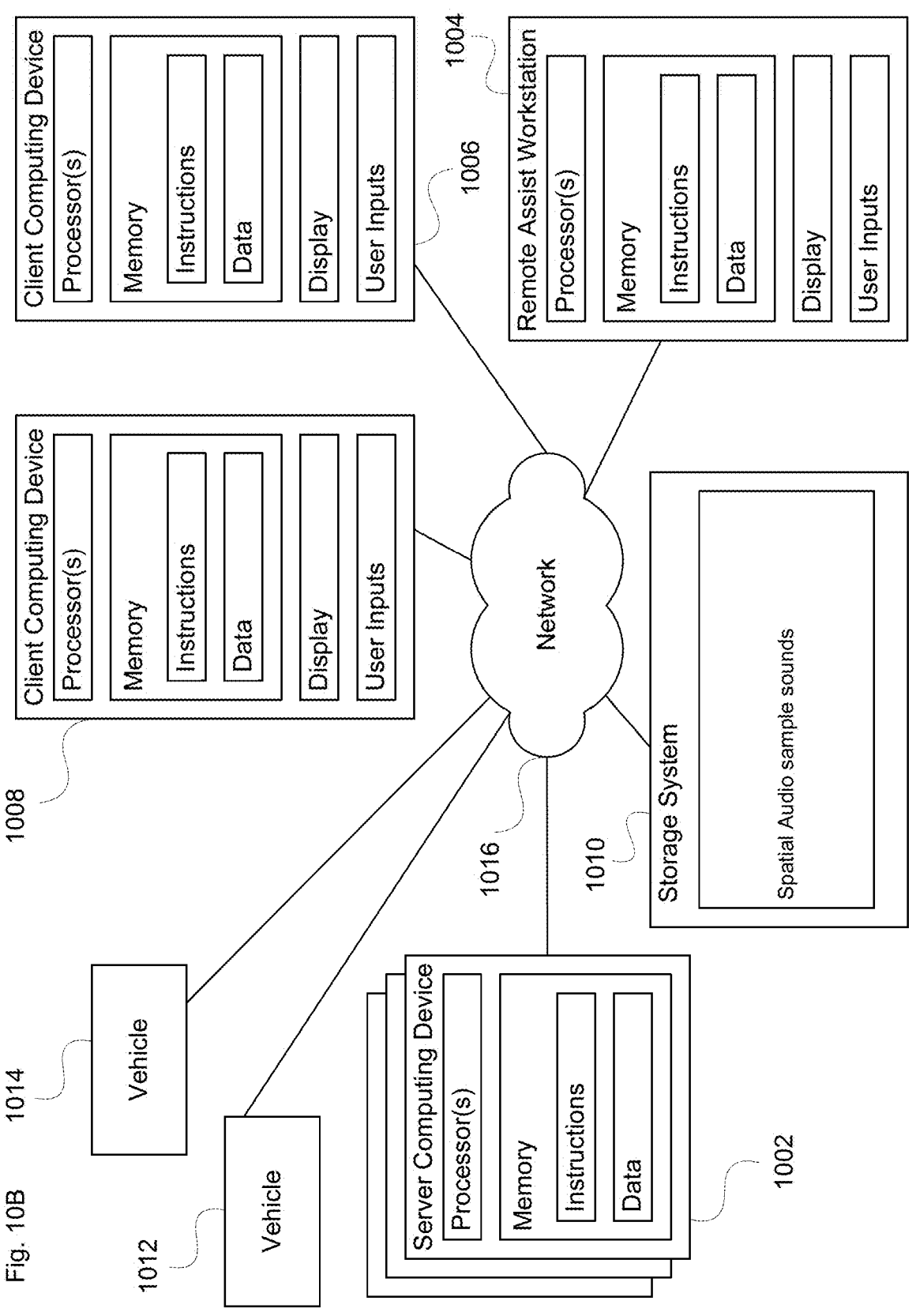

One example of a back-end system that can support spatial audio for users of a fleet of vehicles is shown in FIGS. 10A and 10B. In particular, FIGS. 10A and 10B are pictorial and functional diagrams, respectively, of an example system 1000 that includes a plurality of computing devices 1002, 1004, 1006, 1008 and a storage system 1010 connected via a network 1016. System 1000 also includes vehicles 1012 and 1014 configured to operate in an autonomous driving mode, which may be configured the same as or similarly to vehicles 100, 120, 140 and/or 160 of FIGS. 1A-E. Vehicles 1012 and/or vehicles 1014 may be parts of one or more fleets of vehicles that provide rides for passengers or deliver meals, groceries, cargo or other packages to customers. Although only a few vehicles and computing devices are depicted for simplicity, a typical system may include significantly more, such as tens or hundreds of vehicles. As shown in FIG. 10B, each of computing devices 1002, 1004, 1006 and 1008 may include one or more processors, memory, data and instructions. Such processors, memories, data and instructions may be configured similarly to the ones described above with regard to FIG. 2 or 3A.

The various computing devices and vehicles may communicate directly or indirectly via one or more networks, such as network 1016. The network 1016 and any intervening nodes may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies. Ethernet, WiFi and HTTP, and various combinations of the foregoing. Such communication may be facilitated by any device capable of transmitting data to and from other computing devices, such as modems and wireless interfaces.

In one example, computing device 1002 may include one or more server computing devices having a plurality of computing devices, e.g., a load balanced server farm, that exchange information with different nodes of a network for the purpose of receiving, processing and transmitting the data to and from other computing devices. For instance, computing device 1002 may include one or more server computing devices that are capable of communicating with the computing devices of vehicles 1012 and/or 1014, as well as computing devices 1003, 1006 and 1008 via the network 1016. For example, vehicles 1012 and/or 1014 may be apart of a fleet of autonomous vehicles that can be dispatched by a server computing device to various locations. In this regard, the computing device 1002 may function as a dispatching server computing system which can be used to dispatch vehicles to different locations in order to pick up and drop off passengers or to pick up and deliver cargo or other items. In addition, server computing device 1002 may use network 1016 to transmit and present information to a user of one of the other computing devices or a rider in a vehicle. In this regard, computing devices 1004, 1006 and 1008 may be considered user computing devices.

As shown in FIGS. 10A-B each client computing device 1004, 1006 and 1008 may be a personal computing device intended for use by a respective user 1018, and have all of the components normally used in connection with a personal computing device including a one or more processors (e.g., a central processing unit (CPU), graphics processing unit (GPU) and/or tensor processing unit (TPU)), memory (e.g., RAM and internal hard drives) storing data and instructions, a display (e.g., a monitor having a screen, a touch-screen, a projector, a television, or other device such as a smart watch or head mounted display that is operable to display information), and user input devices (e.g., a mouse keyboard, touchscreen, microphone or gesture sensor such as a close range RF gesture detection device). The client computing devices may also include a camera for recording video streams, speakers, a network interface device, and all of the components used for connecting these elements to one another. While not shown, each of these user devices 1004, 1006 and 1008 may be configured to connect with earbuds or another type of headphones worn by a user, such as a person awaiting pickup, a user meeting the vehicle to get a package, or a rider in the vehicle.

Although the client computing devices may each comprise a full-sized personal computing device, they may alternatively comprise mobile computing devices capable of wirelessly exchanging data with a server over a network such as the Internet. By way of example only, client computing devices 1006 and 1008 may be mobile phones or devices such as a wireless-enabled PDA, a tablet PC, a wearable computing device (e.g., a smartwatch or head mounted display), or a netbook that is capable of obtaining information via the Internet or other networks.

In some examples, client computing device 1004 may be a remote assistance workstation used by an administrator or operator to communicate with riders of dispatched vehicles, customers awaiting deliveries or store employees providing items for delivery. Although only a single remote assistance workstation 1004 is shown in FIGS. 10A-B, any number of such workstations may be included in a given system. Moreover, although the workstation is depicted as a desktop-type computer, such workstations may include various types of personal computing devices such as laptops, netbooks, tablet computers, etc. By way of example, the remote assistance workstation may be used by a technician or other user to help adjust pickup or drop-off locations, assist riders with opening or closing the vehicle's doors, etc. This can include providing spatial audio to a rider or other user.

Storage system 1010 can be of any type of computerized storage capable of storing information accessible, by the server computing devices 1002, such as a hard-drive, memory card, ROM, RAM, DVD, CD-ROM, flash drive and/or tape drive. In addition, storage system 1010 may include a distributed storage system where data is stored on a plurality of different storage devices which may be physically located at the same or different geographic locations. Storage system 1010 may be connected to the computing devices via the network 1016 as shown in FIGS. 10A-B, and/or may be directly connected to or incorporated into any of the computing devices.

Storage system 1010 may store various types of information. For instance, the storage system 1010 may store autonomous vehicle control software which is to be used by vehicles, such as vehicles 1012 or 1014, to operate such vehicles in an autonomous driving mode. Storage system 1010 may also store information used to support spatial audio features, such as different types of sounds that can be shared for presentation via a user's headphones. The storage system 1010 can also include route information, weather information, etc. This information may be shared with the vehicles 1012 and 1014, for instance to help with operating the vehicles in an autonomous driving mode. Such information can also be shared with customers via the UI or other app on their client device(s).

FIG. 11 illustrates a flow diagram 1100 according to one aspect of the technology, which provides a method that estimates, by one or more processors, a current location of a user at block 1102 and identifies, by the one or more processors, an actual location of a vehicle or a pickup location associated with the vehicle at block 1104. The method further includes estimating, by the one or more processors at block 1106, a pose of the user relative to the actual location of the vehicle or the pickup location, selecting, a sound at block 1108, and at block 1110 generating, based on the selected sound, a spatial audio signal. The spatial audio signal has a directional component according to the estimated pose of the user relative to the actual location of the vehicle or the pickup location. And at block 1112 the method also includes providing the spatial audio signal for presentation to the user via headphones worn by the user.

FIG. 12 illustrates a flow diagram 1200 according to another aspect of the technology. This flow diagram provides a method that includes identifying, by one or more processors of a vehicle, an actual location of the vehicle at block 1202 and detecting, by a perception system of the vehicle, a presence of an object in a vicinity of the vehicle at block 1204. Based on detecting the presence of the object in the vicinity of the vehicle, the method includes selecting a sound at block 1206. At block 1208 the method includes generating, based on the selected sound, a spatial audio signal. The spatial audio signal has a directional component according to the actual location of the vehicle and a relative position of the object in the vicinity of the vehicle. And at block 1210 the method includes providing the spatial audio signal for presentation to a rider within the vehicle.

While certain use cases described above focus on rider pickup situations in the ride hailing context, the technology may be used in many other situations. As noted earlier, this can include delivery situations, where the person going to the vehicle may be a restaurant or store employee loading the vehicle with a meal, groceries, prescription or other package. Similarly, in a trucking, scenario, the person or people heading to the vehicle could be warehouse workers that will load or unload the truck with cargo, or that need to transfer cargo to or from the truck (e.g., a mail delivery truck). All of these situations can benefit from the spatial audio features described above.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A computer-implemented method, comprising:
   estimating, by one or more processors, a current location of a user;
   identifying, by the one or more processors, an actual location of a vehicle;
   estimating, by the one or more processors, a pose of the user based on dynamic detection of an orientation of the user's head;
   selecting, by the one or more processors, a sound;
   generating, by the one or more processors based on the selected sound, a spatial audio signal, the spatial audio signal having a directional component according to a heading of the user and a heading of the vehicle, and the generating including dynamically adjusting the directional component of the spatial audio signal in response to detected changes in the estimated pose of the user; and
   providing the spatial audio signal for presentation to the user.

2. The method of claim 1, wherein the detected changes in the estimated pose of the user includes dynamic detection of the orientation of the user's head based on detecting head movements for determining a looking direction of the user and detecting body movements for determining a movement direction of the user.

3. The method of claim 1, wherein the dynamic detection of the orientation of the user's head is based on sensor information obtained from at least one sensor of headphones worn by the user, and the at least one sensor includes at least one of a gyroscope of the headphones, a magnetometer of the headphones, or an accelerometer of the headphones.

4. The method of claim 1, wherein estimating the current location of the user is based on sensor information received from headphones worn by the user or based on sensor information received from a client device of the user.

5. The method of claim 1, wherein providing the spatial audio signal for presentation to the user includes transmitting the spatial audio signal from the vehicle or a client device of the user to headphones worn by the user, and estimating the pose of the user is based on sensor information obtained by the client device.

6. The method of claim 1, wherein the heading of the vehicle is based on sensor information from a positioning system of the vehicle.

7. The method of claim 1, wherein estimating the pose of the user is based on perception information received from the vehicle.

8. The method of claim 1, wherein the spatial audio signal further includes a loudness component to indicate a relative distance between the current location of the user and the actual location of the vehicle.

9. The method of claim 1, wherein generating the spatial audio signal includes generating a three-dimensional scene based on the current location of the user or the actual location of the vehicle, and the three-dimensional scene includes one or more objects in an environment of the user.

10. The method of claim 1, wherein generating the spatial audio signal further includes generating the spatial audio signal having the directional component according to the estimated pose of the user relative to a new location of the vehicle.

11. The method of claim 1, further comprising varying a directional accuracy of the spatial audio signal based on a relative distance between the user and the actual location of the vehicle.

12. The method of claim 1, further comprising generating turn-by-turn directions for the user to the vehicle, the spatial audio signal being configured to play concurrently with the turn-by-turn directions.

13. The method of claim 1, wherein the sound is selected based, at least partially on ambient noise around the user.

14. A computing device, comprising:
   memory storing a set of sounds; and
   one or more processors operatively coupled to the memory, the one or more processors being configured to:
      estimate a current location of a user;
      identify an actual location of a vehicle;
      estimate a pose of the user based on dynamic detection of an orientation of the user's head;
      select a sound from the set of sounds in the memory;
      generate, based on the selected sound, a spatial audio signal, the spatial audio signal having a directional component according to a heading of the user and a heading of the vehicle, and the generation of the spatial audio signal includes dynamically adjusting the directional component of the spatial audio signal in response to detected changes in the estimated pose of the user; and
      provide the spatial audio signal for presentation to the user.

15. A computer-implemented method, comprising:
   identifying, by one or more processors of a vehicle, an actual location of the vehicle;
   estimating, by the one or more processors, a heading of the vehicle;
   detecting, by a perception system of the vehicle, a presence of an object in a vicinity of the vehicle;
   selecting, by the one or more processors, a sound based on detecting the presence of the object in the vicinity of the vehicle;
   generating, by the one or more processors, based on the selected sound, a spatial audio signal, the spatial audio signal having a directional component according to the heading of the vehicle, a relative position of the object in the vicinity of the vehicle, and dynamic detection of an orientation of a rider's head, the generating includes dynamically adjusting the directional component of the spatial audio signal in response to detected changes in the dynamic detection of the orientation of the rider's head; and providing, by the one or more processors, the spatial audio signal for presentation to the rider within the vehicle.

16. The method of claim 15, wherein the sound is selected, at least partially, based on a user preference.

17. The method of claim 15, wherein the spatial audio signal indicates a side of the vehicle to exit or a door of the vehicle to exit.

18. The method of claim 15, wherein the heading of the vehicle is based on sensor information from a positioning system of the vehicle.

19. The method of claim 15, wherein the spatial audio signal further includes a loudness component to indicate a relative distance between the actual location of the vehicle and a location of the object in the vicinity of the vehicle, and the method further comprises varying the loudness component based on the relative distance between the object and the vehicle.

20. The method of claim 15, wherein generating the spatial audio signal further includes generating the spatial audio signal having the directional component according to the dynamic detection of the orientation of the rider's head relative to a new location of the vehicle or a new heading of the vehicle.

21. The method of claim 15, wherein the spatial audio signal verbally indicates a type of the object.

22. The method of claim 15, wherein the spatial audio signal is provided in conjunction with an assistant feature that identifies a certain location or a certain landmark.

23. The method of claim 15, wherein the spatial audio signal provides information about a trip taken by the rider in the vehicle.

24. A vehicle configured to operate in an autonomous driving mode, the vehicle comprising:

a perception system including one or more sensors, the one or more sensors being configured to receive sensor data associated with objects in an external environment of the vehicle and detect a presence of an object in a vicinity of the vehicle;

a driving system including a steering subsystem, an acceleration subsystem and a deceleration subsystem to control driving of the vehicle;

a positioning system configured to identify an actual location of the vehicle and estimate a heading of the vehicle; and a control system including one or more processors, the control system operatively coupled to the driving system, the perception system, and the positioning system, the control system configured to:

based on detecting the presence of the object in the vicinity of the vehicle, select a sound generate, based on the selected sound, a spatial audio signal, the spatial audio signal having a directional component according to the actual location of the vehicle, a relative position of the object in the vicinity of the vehicle, the estimated heading of the vehicle, and dynamic detection of an orientation of a rider's head, and the generating includes dynamically adjust the directional component of the spatial audio signal in response to detected changes in the dynamic detection of the orientation of the rider's head and detected changes of the heading of the vehicle; and provide the spatial audio signal for presentation to the rider within the vehicle.

* * * * *